(12) United States Patent
Koo et al.

(10) Patent No.: US 11,025,957 B2
(45) Date of Patent: Jun. 1, 2021

(54) METHOD AND APPARATUS FOR PERFORMING TRANSFORM USING LAYERED GIVENS TRANSFORM

(71) Applicant: LG Electronics Inc., Seoul (KR)

(72) Inventors: Moonmo Koo, Seoul (KR); Onur Guleryuz, San Jose, CA (US)

(73) Assignee: LG Electronics Inc., Seoul (KR)

(*) Notice: Subject to any disclaimer, the term of this patent is extended or adjusted under 35 U.S.C. 154(b) by 491 days.

(21) Appl. No.: 15/886,548

(22) Filed: Feb. 1, 2018

(65) Prior Publication Data
US 2018/0220157 A1    Aug. 2, 2018

Related U.S. Application Data

(60) Provisional application No. 62/453,474, filed on Feb. 1, 2017.

(51) Int. Cl.
| | |
|---|---|
| *H04N 19/63* | (2014.01) |
| *H04N 19/60* | (2014.01) |
| *H04N 19/91* | (2014.01) |
| *H04N 19/124* | (2014.01) |
| *G06F 17/14* | (2006.01) |

(52) U.S. Cl.
CPC ............ *H04N 19/60* (2014.11); *G06F 17/14* (2013.01); *H04N 19/124* (2014.11); *H04N 19/91* (2014.11)

(58) Field of Classification Search
CPC ...... H04N 19/60; H04N 19/124; H04N 19/91; H04N 19/63; G06F 17/14
See application file for complete search history.

(56) References Cited

U.S. PATENT DOCUMENTS

| | | | | |
|---|---|---|---|---|
| 2007/0276893 | A1* | 11/2007 | Huang | G06F 17/147 708/400 |
| 2009/0245401 | A1* | 10/2009 | Chrabieh | H04L 1/0041 375/260 |
| 2010/0226456 | A1* | 9/2010 | Ariyavisitakul | H04B 7/0617 375/267 |
| 2015/0055697 | A1* | 2/2015 | Wu | H04N 19/176 375/240.02 |
| 2016/0219290 | A1* | 7/2016 | Zhao | H04N 19/112 |

* cited by examiner

*Primary Examiner* — Patrick E Demosky
(74) *Attorney, Agent, or Firm* — Fish & Richardson P.C.

(57) ABSTRACT

A method for performing a transform by using Layered Givens Transform may include: deriving at least one rotation layer, a first permutation layer and a second permutation layer based on a given transform matrix H and an error parameter; obtaining a Layered Givens Transform (LGT) coefficient based on the rotation layer, the first permutation layer and the second permutation layer; and performing quantization and entropy encoding with respect to the LGT coefficient, the first permutation layer and the second permutation layer may include a permutation matrix obtained by permuting a row of an identity matrix, and the LGT coefficient may be obtained by sequentially applying the first permutation layer, the rotation layer and the second permutation layer respectively.

9 Claims, 17 Drawing Sheets

(a)

METHOD AND APPARATUS FOR PERFORMING TRANSFORM USING LAYERED GIVENS TRANSFORM

CROSS-REFERENCE TO RELATED APPLICATIONS

This application claims the benefit of an earlier filing date and right of priority to U.S. Provisional Patent Application No. 62/453,474 filed on Feb. 1, 2017, the entire contents of which are hereby incorporated by reference in its entirety.

TECHNICAL FIELD

The present invention relates to a method and apparatus for encoding/decoding a video signal, and more particularly, to a technique of approximating a target transform given by using Layered Givens Transform.

BACKGROUND

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted. Accordingly, it is required to design the coding tool for processing the next generation video contents efficiently.

Particularly, many image processing and compression techniques have adopted a separable transform. For example, Discrete Cosine Transform (hereinafter, referred to as 'DCT') has been widely used since it provides a good approximation to Karhunen-Loeve transform (hereinafter, referred to as 'KLT') when inter-pixel correlation is high and low-complexity implementation is available. Regardless of using the separable transforms, since a natural image compression has very different statistical properties, better compression is available to perform for the natural image compression only when a complex transform that may be applied to variable statistical properties of signal blocks is used.

So far, practical implementations have been targeted to the separable approximation of the transforms in order to provide a reasonable coding gain of low complexity. For example, a mode-dependent transform scheme is designed such that separable KLT is to alleviate the complexity of inseparable KLT for each mode. As another example, Asymmetric Discrete Sine Transform (hereinafter, referred to as 'ADST') has been integrated into hybrid DCT/ADST technique, and a separable sparse orthonormal transform design and the like has been considered.

SUMMARY

An object of the present invention provides a method of designing a transform that has significantly low operation complexity while showing similar compression performance to a target transform of high operation complexity.

In addition, an object of the present invention provides a method of designing Layered Givens Transform (LGT) that approximates to a target transform when the target transform is given.

In addition, an object of the present invention provides a method of designing Layered Givens Transform (LGT) that has higher approximation in comparison with a target transform.

In addition, an object of the present invention provides a method for increasing approximation for a target transform of Layered Givens Transform (LGT) by applying a permutation matrix additionally behind the last givens rotation layer.

In addition, an object of the present invention provides a method for applying Hungarian method by using an absolute operator for determining a permutation matrix.

The objects of the present invention are not limited to the technical objects described above, and other technical that are objects not mentioned herein may be understood to those skilled in the art from the description below.

In an aspect, a method for performing a transform by using Layered Givens Transform is provided. The method may include deriving at least one rotation layer, a first permutation layer and a second permutation layer based on a given transform matrix H and an error parameter; obtaining a Layered Givens Transform (LGT) coefficient based on the rotation layer, the first permutation layer and the second permutation layer; and performing quantization and entropy encoding with respect to the LGT coefficient, the first permutation layer and the second permutation layer may include a permutation matrix obtained by permuting a row of an identity matrix, and the LGT coefficient may be obtained by sequentially applying the first permutation layer, the rotation layer and the second permutation layer respectively.

Preferably, the rotation layer may include a permutation matrix and a rotation matrix, and the rotation matrix may include at least one pairwise rotation matrix.

Preferably, the first permutation layer or the second permutation layer may be derived through an optimization procedure, the optimization procedure may be performed based on matching the Layered Givens Transform (LGT) matrix with the given transform matrix H, and the LGT matrix may be derived by using the rotation layer, the first permutation layer and the second permutation layer.

Preferably, the optimization procedure of the first permutation layer or the second permutation layer may be performed by using Hungarian algorithm.

Preferably, the Hungarian algorithm may be performed by using an input to which an absolute operator is applied.

Preferably, in another aspect, a method for performing an inverse-transform by using Layered Givens Transform is provided. The method may include obtaining a Layered Givens Transform (LGT) coefficient by performing an entropy encoding and a dequantization with respect to a residual signal included in a video signal; deriving at least one rotation layer, a first permutation layer and a second permutation layer based on a given transform matrix H and an error parameter; performing an inverse-transform with respect to the LGT coefficient based on the rotation layer, the first permutation layer and the second permutation layer; and reconstructing the video signal by using the inverse-transformed coefficient, the permutation layers may include a permutation matrix obtained by permuting a row of an identity matrix, and the inverse-transform with respect to the LGT coefficient may be performed by sequentially applying the first permutation layer, the rotation layer and the second permutation layer respectively.

Preferably, the rotation layer may include a permutation matrix and a rotation matrix, and the rotation matrix may include at least one pairwise rotation matrix.

Preferably, the first permutation layer or the second permutation layer may be derived through an optimization procedure, the optimization procedure may be performed based on matching the Layered Givens Transform (LGT) matrix with the given transform matrix H, and the LGT matrix may be derived by using the rotation layer, the first permutation layer and the second permutation layer.

Preferably, the optimization procedure of the first permutation layer or the second permutation layer may be performed by using Hungarian algorithm.

Preferably, the Hungarian algorithm may be performed by using an input to which an absolute operator is applied.

Preferably, in still another aspect, an apparatus for performing an inverse-transform by using Layered Givens Transform is provided. The apparatus may include an entropy decoding unit configured to entropy-decode a residual signal included in a video signal; a layer derivation unit configured to derive at least one rotation layer, a first permutation layer and a second permutation layer based on a given transform matrix H and an error parameter; an inverse-transform unit configured to perform an inverse-transform with respect to the LGT coefficient based on the rotation layer, the first permutation layer and the second permutation layer; and a reconstruction unit configured to reconstruct the video signal by using the inverse-transformed coefficient, the permutation layers may include a permutation matrix obtained by permuting a row of an identity matrix, and the inverse-transform with respect to the LGT coefficient may be performed by sequentially applying the first permutation layer, the rotation layer and the second permutation layer respectively.

DETAILED DESCRIPTION

Hereinafter, a configuration and operation of an embodiment of the present invention will be described in detail with reference to the accompanying drawings, a configuration and operation of the present invention described with reference to the drawings are described as an embodiment, and the scope, a core configuration, and operation of the present invention are not limited thereto.

Further, although general terms widely used currently are selected as the terms in the present invention as much as possible, a term that is arbitrarily selected by the applicant is used in a specific case. Since the meaning of the term will be clearly described in the corresponding part of the description in such a case, it is understood that the present invention will not be simply interpreted by the terms only used in the description of the present invention, but the meaning of the terms should be figured out.

In addition, when there is a general term selected for describing the invention or another term having a similar meaning, terms used in the present invention may be replaced for more appropriate interpretation. For example, in each coding process, a signal, data, a sample, a picture, a frame, and a block may be appropriately replaced and construed. Further, in each coding process, partitioning, decomposition, splitting, and division may be appropriately replaced and construed.

Figure 1:
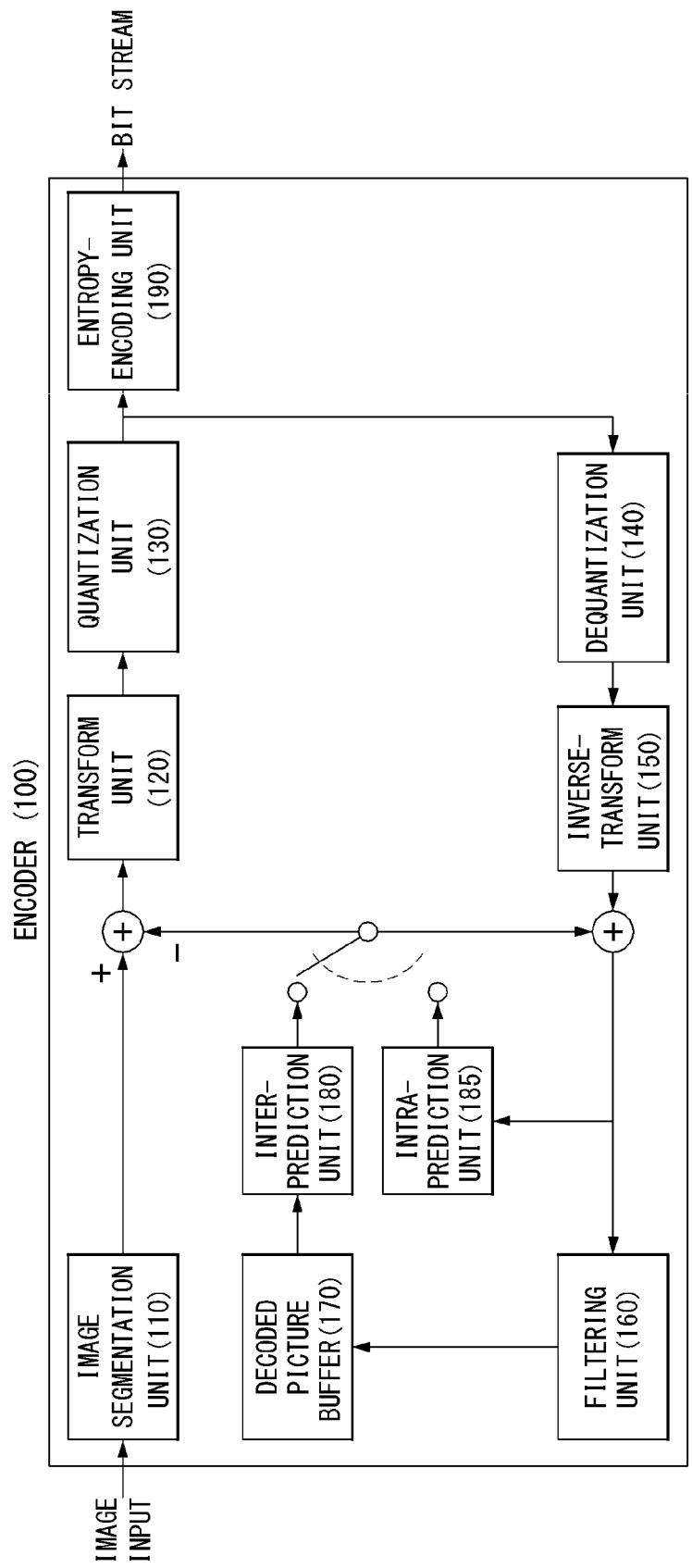
FIG. 1 illustrates a schematic block diagram of an encoder in which an encoding of a video signal is performed as an embodiment to which the present invention is applied.

FIG. 1 illustrates a schematic block diagram of an encoder in which an encoding of a video signal is performed as an embodiment to which the present invention is applied.

Referring to FIG. 1, an encoder 100 may include an image segmentation unit 110, a transform unit 120, a quantization unit 130, a dequantization unit 140, an inverse-transform unit 150, a filtering unit 160, a decoded picture buffer (DPB) 170, an inter-prediction unit 180, an intra-prediction unit 185 and an entropy-encoding unit 190.

The image segmentation unit 110 partitions an input image (or a picture frame) inputted to the encoder 100 into one or more process units. For example, the process unit may be a coding tree unit (CTU), a coding unit (CU), a prediction unit (PU) or a transform unit (TU).

However, the terms are used only for the convenience of description for the present invention, but the present invention is not limited to the definition of the corresponding term. In addition, the convenience of description, in the present invention, the term of coding unit is used as a unit used in the process of encoding or decoding a video signal, but the present invention is not limited thereto, and may be interpreted properly according to the contents of the invention.

The encoder 100 may generate a residual signal by subtracting the prediction signal outputted from the inter-prediction unit 180 and the intra-prediction unit 185 in the input image signal, and the generated residual signal is transmitted to the transform unit 120.

The transform unit 120 may generate a transform coefficient by applying a transform technique to the residual signal. The transform process may be applied to a pixel block that has the same size as a square, or may also be applied to a block of variable size.

The quantization unit 130 may quantize the transform coefficient and transmits the quantized coefficient to the entropy-encoding unit 190. The entropy-encoding unit 190 may entropy-code the quantized signal and then output the entropy-coded signal as bitstreams.

The quantized signal output from the quantization unit 130 may be used to generate a prediction signal. For example, the quantized signal may be subjected to a dequantization and an inverse-transform via the dequantization unit 140 and the inverse-transform unit 150 in the loop respectively to reconstruct a residual signal. The reconstructed residual signal may be added to the prediction signal output from the inter-prediction unit 180 or intra-prediction unit 185 to generate a reconstructed signal.

On the other hand, during such a compression process, quantization is performed block by block, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter-prediction unit 180. As such, by using the filtered picture as a reference picture in an inter-picture prediction mode, the encoding rate as well as the image quality may be improved.

The decoded picture buffer 170 may store the filtered picture in order to use it as a reference picture in the inter-prediction unit 180.

The inter-prediction unit 180 performs a temporal prediction and/or a spatial prediction by referencing the reconstructed picture in order to remove a temporal redundancy and/or a spatial redundancy. Here, since the reference picture used for performing a prediction is a transformed signal that goes through the quantization or the dequantization by a unit of block when being encoded/decoded previously, there may exist blocking artifact or ringing artifact.

Accordingly, in order to solve the performance degradation owing to the discontinuity of such a signal or the quantization, by applying a low pass filter to the inter-prediction unit 180, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter-prediction unit 180 may perform prediction by generating an interpolation pixel by applying the interpolation filter to the integer pixel, and by using the interpolated block that includes interpolated pixels as a prediction block.

The intra-prediction unit 185 predicts the current block by referring to the samples adjacent the block that is to be encoded currently. The intra-prediction unit 185 may perform the following procedure in order to perform the intra-prediction. First, the intra-prediction unit 185 may prepare a reference sample that is required for generating a prediction signal. And, the intra-prediction unit 185 may generate a prediction signal by using the reference sample prepared. Later, the intra-prediction unit 185 may encode the prediction mode. In this case, the reference sample may be prepared through reference sample padding and/or reference sample filtering. Since the reference sample goes through the prediction and the reconstruction process, there may be a quantization error. Accordingly, in order to decrease such an error, the reference sample filtering process may be performed for each prediction mode that is used for the intra-prediction.

The prediction signal generated via the inter-prediction unit 180 or the intra-prediction unit 185 may be used to generate the reconstructed signal or used to generate the residual signal.

Figure 2:
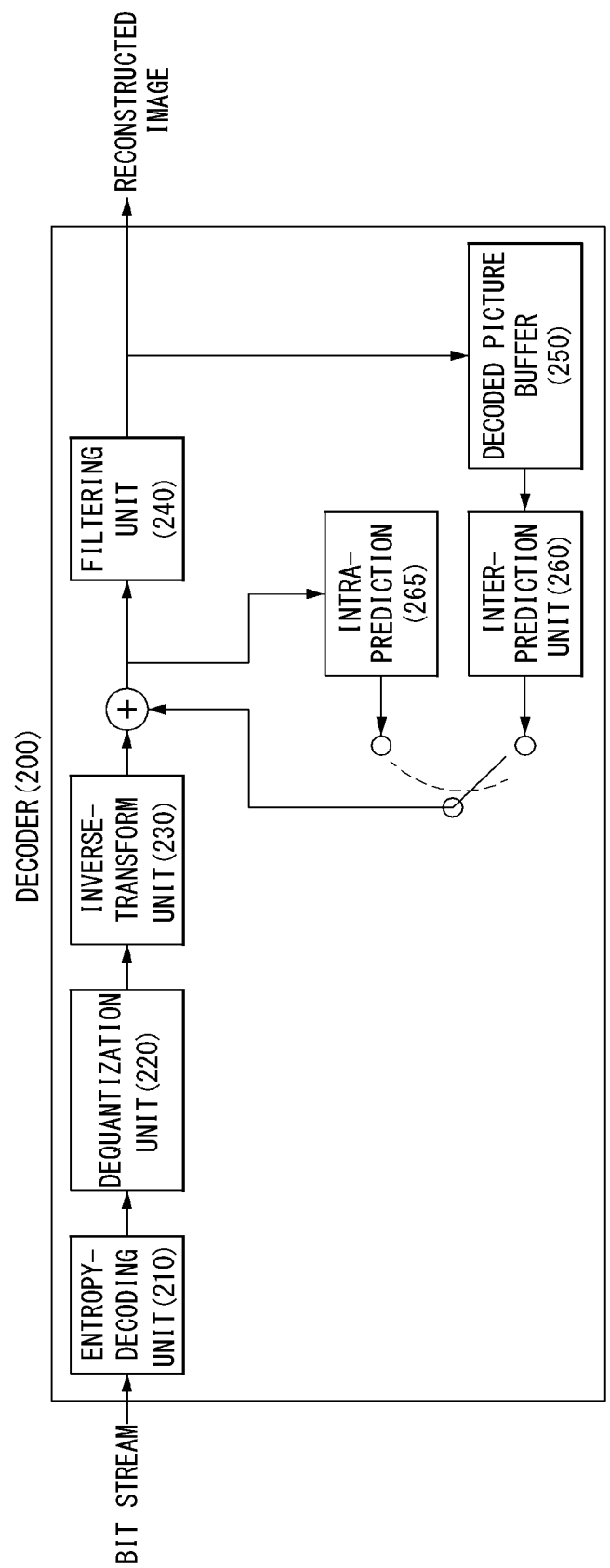
FIG. 2 illustrates a schematic block diagram of a decoder in which a decoding of a video signal is performed as an embodiment to which the present invention is applied.

FIG. 2 illustrates a schematic block diagram of a decoder in which a decoding of a video signal is performed as an embodiment to which the present invention is applied.

Referring to FIG. 2, a decoder 200 may include a parsing unit (not shown), an entropy-decoding unit 210, a dequantization unit 220, an inverse-transform unit 230, a filtering unit 240, a decoded picture buffer (DPB) 250, an inter-prediction unit 260 and an intra-prediction unit 265.

A reconstructed video signal output through the decoder 200 may be displayed on a di splay apparatus.

The decoder 200 may receive the signal output from the encoder as shown in FIG. 1. The received signal may be entropy-decoded via the entropy-decoding unit 210.

The dequantization unit 220 may obtain a transform coefficient from the entropy-decoded signal using quantization step size information.

The inverse-transform unit 230 may inverse-transform the transform coefficient to obtain a residual signal.

A reconstructed signal may be generated by adding the obtained residual signal to the prediction signal output from the inter-prediction unit 260 or the intra-prediction unit 265.

The filtering unit 240 may apply filtering to the reconstructed signal and may output the filtered reconstructed signal to the display apparatus or the decoded picture buffer unit 250. The filtered signal transmitted to the decoded picture buffer unit 250 may be used as a reference picture in the inter-prediction unit 260.

In the present disclosure, the embodiments described in the transform unit 120 and other functional units of the encoder 100 may be equally applied to the inverse-transform unit 230 and the corresponding functional units, respectively.

Figure 3A:
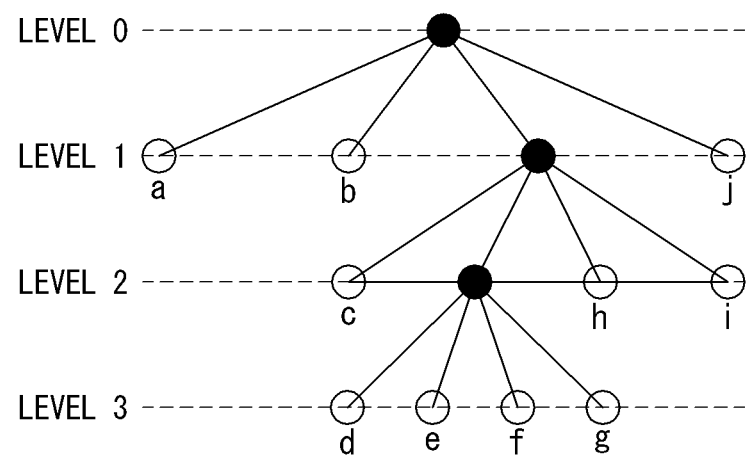
FIGS. 3A and 3B are diagrams for describing a division structure of a coding unit as an embodiment to which the present invention is applied.
Figure 3B:
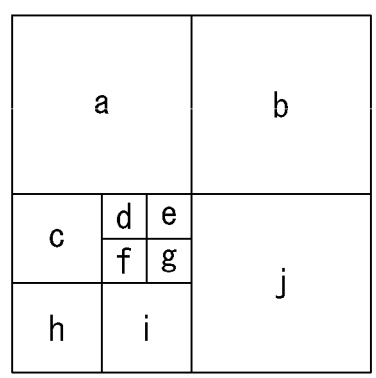

FIGS. 3A and 3B are diagrams for describing a division structure of a coding unit as an embodiment to which the present invention is applied.

The encoder may split one video (or picture) in a coding tree unit (CTU) of a quadrangle form. The encoder sequentially encodes by one CTU in raster scan order.

For example, a size of the CTU may be determined to any one of 64×64, 32×32, and 16×16, but the present invention is not limited thereto. The encoder may select and use a size of the CTU according to a resolution of an input image or a property of an input image. The CTU may include a coding tree block (CTB) of a luma component and a coding tree block (CTB) of two chroma components corresponding thereto.

One CTU may be decomposed in a quadtree (hereinafter, referred to as 'QT') structure. For example, one CTU may be split into four units in which a length of each side reduces in a half while having a square form. Decomposition of such a QT structure may be recursively performed.

Referring to FIG. 3A, a root node of the QT may be related to the CTU. The QT may be split until arriving at a leaf node, and in this case, the leaf node may be referred to as a coding unit (CU).

The CU may mean a basic unit of a processing process of input image, for example, coding in which intra/inter prediction is performed. The CU may include a coding block (CB) of a luma component and a CB of two chroma components corresponding thereto. For example, a size of the CU may be determined to any one of 64×64, 32×32, 16×16, and 8×8, but the present invention is not limited thereto, and when video is high resolution video, a size of the CU may further increase or may be various sizes.

Referring to FIG. 3A, the CTU corresponds to a root node and has a smallest depth (i.e., level 0) value. The CTU may not be split according to a property of input image, and in this case, the CTU corresponds to a CU.

The CTU may be decomposed in a QT form and thus lower level nodes having a depth of a level 1 may be generated. In a lower level node having a depth of a level 1, a node (i.e., a leaf node) that is no longer split corresponds to the CU. For example, as shown in FIG. 3B, CU(a), CU(b), and CU(j) corresponding to nodes a, b, and j are split one time in the CTU and have a depth of a level 1.

At least one of nodes having a depth of a level 1 may be again split in a QT form. In a lower level having a depth of a level 2, a node (i.e., a leaf node) that is no longer split corresponds to a CU. For example, as shown in FIG. 3B, CU(c), CU(h), and CU(i) corresponding to nodes c, h, and I are split twice in the CTU and have a depth of a level 2.

Further, at least one of nodes having a depth of a level 2 may be again split in a QT form. In a lower level node having a depth of a level 3, a node (i.e., a leaf node) that is no longer split corresponds to a CU. For example, as shown in FIG. 3B, CU(d), CU(e), CU(f), and CU(g) corresponding to d, e, f, and g are split three times in the CTU and have a depth of a level 3.

In an encoder, the maximum size or the minimum size of a CU may be determined according to the characteristics of a video image (e.g., resolution) or by considering encoding rate. And, the information for this or the information that may derive this may be included in a bit stream. The CU that has the maximum size is referred to as a largest coding unit (LCU), and the CU that has the minimum size is referred to as a smallest coding unit (SCU).

In addition, the CU that has a tree structure may be hierarchically partitioned with predetermined maximum depth information (or maximum level information). And, each partitioned CU may have the depth information. Since the depth information represents a partitioned count and/or degree of a CU, the depth information may include the information of a size of CU.

Since the LCU is partitioned in a Quad-tree shape, the size of SCU may be obtained by using a size of LCU and the maximum depth information. Or, inversely, the size of LCU may be obtained by using a size of SCU and the maximum depth information of the tree.

For one CU, information representing whether a corresponding CU is split may be transferred to the decoder. For example, the information may be defined to a split flag and may be represented with "split_cu_flag". The split flag may be included in the entire CU, except for the SCU. For example, when a value of the split flag is '1', a corresponding CU is again split into four CUs, and when a value of the split flag is '0', a corresponding CU is no longer split and a coding process of the corresponding CU may be performed.

In an embodiment of FIGS. 3A and 3B, a split process of the CU is exemplified, but the above-described QT structure may be applied even to a split process of a transform unit (TU), which is a basic unit that performs transform.

The TU may be hierarchically split in a QT structure from a CU to code. For example, the CU may correspond to a root node of a tree of the transform unit (TU).

Because the TU is split in a QT structure, the TU split from the CU may be again split into a smaller lower level TU. For example, a size of the TU may be determined to any one of 32×32, 16×16, 8×8, and 4×4, but the present invention is not limited thereto, and when the TU is high resolution video, a size of the TU may increase or may be various sizes.

For one TU, information representing whether a corresponding TU is split may be transferred to the decoder. For example, the information may be defined to a split transform flag and may be represented with a "split_transform_flag".

The split transform flag may be included in all TUs, except for a TU of a minimum size. For example, when a value of the split transform flag is '1', a corresponding TU is again split into four TUs, and a value of the split transform flag is '0', a corresponding TU is no longer split.

As described above, the CU is a basic unit of coding that performs intra-prediction or inter-prediction. In order to more effectively code an input image, the CU may be split into a prediction unit (PU).

A PU is a basic unit that generates a prediction block, and a prediction block may be differently generated in a PU unit even within one CU. The PU may be differently split according to whether an intra-prediction mode is used or an inter-prediction mode is used as a coding mode of the CU to which the PU belongs.

A transform coding is one of the important tools used in image and video compression currently. Data is linearly transformed using a transform, and a transform coefficient is generated. The generated data is transmitted to a decoder after being quantized and entropy-encoded. After decoding and entropy-decoding, the decoder inverse-transforms the transform coefficient, and reconstructs the data. Generally, a transform is selected as an orthonormal transform that allows simple inverse-transform and quantization. Particularly, for image and video data, it is very general to utilize a separable Discrete Cosine Transform (DCT), a Discrete Cosine Transform (DST) and other similar transform.

For data of N×N block, a separable transform requires an operation of $N^3$, generally. In the case that the used separable transform has fast implementation, an operation count decreases to $N^2 * \log N$.

In order to increase compression efficiency, it is important that a transform coefficient is independent statistically by designing a statistics of input data to be identical more efficiently. For example, compression efficiency may be improved by using Karhunen-Loeve Transform (KLT) or Sparse Orthonormal Transform (SOT). However, such a transform corresponds to non-separable transform which is hard to fast implementation. That is, $N^4$ operation is required for applying such a non-separable transform.

The present invention proposes a method of designing an easily calculable version of a general transform. Particularly, when a target transform is given, the present invention proposes a method of designing Layered Givens Transform (LGT) that approximates to the target transform.

According to the present invention, with the calculation complexity which is significantly decreased in comparison with the target transform, a transform may be designed, which has the same or similar compression efficiency as the given target transform.

Hereinafter, the present invention will be described by using a square block of N×N block. However, the present invention is not limited thereto, but extendable to non-square blocks, multiple dimensions and non-pixel type data, and accordingly, more adaptive transform may be performed.

In the present invention, a target transform H which is applicable to N×N block may be approximated by Layered Givens Transform including a combination of a rotation layer and a permutation layer. In the present invention, the Layered Givens Transform may be referred to as layered transform, but the present invention is not limited to the term.

Definition of Layered Givens Transform (LGT)

Hereinafter, a matrix expression of N×N image or video block and a transformation will be described. In the description of the present invention, it is assumed that $N^2$ is an even number for the convenience of description.

Figure 4:
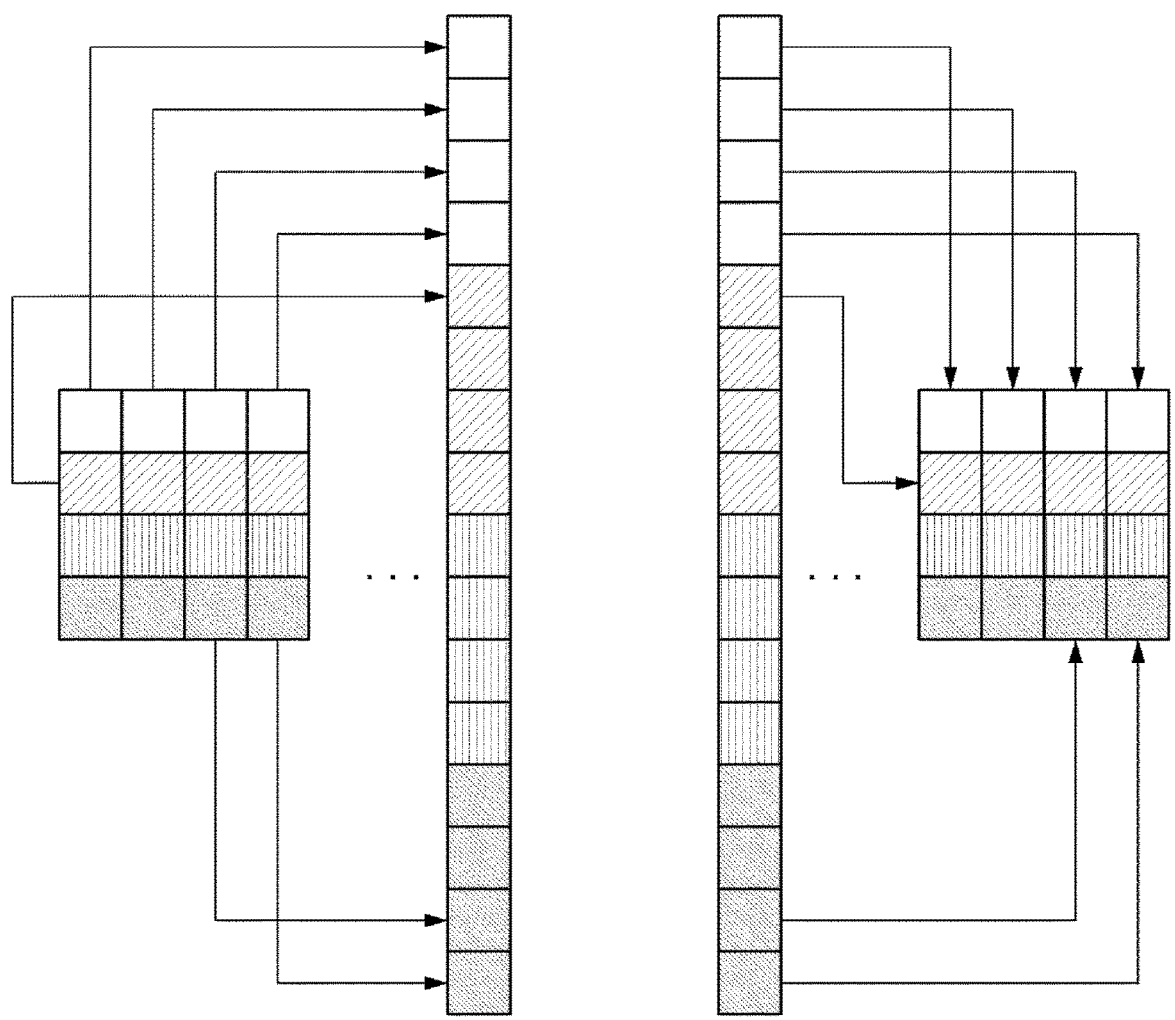
FIG. 4 is a diagram illustrating a method of arranging 2-dimensional data block into one-dimensional array as an embodiment to which the present invention is applied.

FIG. 4 is a diagram illustrating a method of arranging 2-dimensional data block into one-dimensional array as an embodiment to which the present invention is applied.

In order to apply a non-separable transform, a data block (or 2-dimensional array) may be arranged into 1-dimensional array. For example, as shown in FIG. 4, a block of 4×4 sizes may be arranged in a row-first lexicographic order. In each row, the block may be arranged in a column order. Although it is not shown in FIG. 4, the block may be arranged in a column-first order. However, the present invention is not limited thereto, encoder/decoder may arrange 2-dimensional block into 1-dimensional array in various methods except the lexicographic order.

In the present invention, the Layered Givens Transform may be applied to an arbitrary N×N transform. Generally, a non-separable transform has higher compression performance in comparison with a separable transform, but it is hard to fast implementation and requires high operation complexity. Accordingly, embodiment of the present invention will be described mainly with the case that a target transform is a non-separable transform, but the present invention is not limited thereto. That is, the Layered Givens Transform may be applied to a separable transform, but may also be applied to a non-separable transform.

General non-separable transform H that may be applied to N×N block may be represented as $N^2 \times N^2$ matrix. The method proposed in the present invention may be used for approximating a non-orthogonal transform, but for the convenience of description, it is assumed that a target transform H satisfies orthogonal transform, that is, Equation 1 below.

$$H^T H = 1, \qquad \text{[Equation 1]}$$

Here, $H^T$ represents a transpose matrix of H, and I represents an identity matrix of $N^2 \times N^2$. In addition, $N^2 \times N^2$ permutation matrix P is an orthogonal matrix and satisfies Equation 2 below.

$$P^T P = 1, \qquad \text{[Equation 2]}$$

Each row of P may include a single non-zero element. When data vector x is given, vector y that satisfies y=P*x may be obtained by shuffling the elements of vector x.

Figure 5:
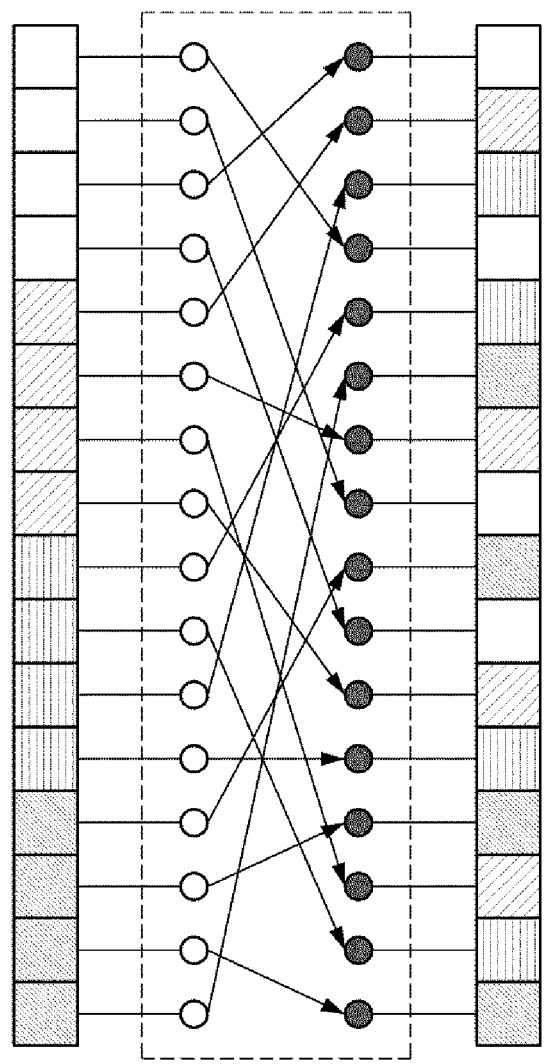
FIG. 5 is a diagram illustrating an example in which a permutation matrix is applied as an embodiment to which the present invention is applied.

FIG. 5 is a diagram illustrating an example in which a permutation matrix is applied as an embodiment to which the present invention is applied.

Encoder/decoder may shuffle a data vector by applying the permutation matrix as shown in FIG. 5. By performing shuffling as such, a later operation may be efficiently performed. For example, through shuffling, a non-zero coefficient may be concentrated on a specific area.

The present invention proposes a method of finding the Layered Givens Transform G ($N^2 \times N^2$) which is approximate to H, when target transform H is given. G may be represented as Equation 3 below.

$$G = G_M G_{M-1} \ldots G_1 P_0 \qquad \text{[Equation 3]}$$

Herein, $G_i$ ($N^2 \times N^2$) (in this case, i=1, 2, ..., M) is a Givens rotation layer (or a rotation layer, a rotation matrix), and $P_0$ ($N^2 \times N^2$) is a permutation layer (or permutation matrix). An integer M may have an arbitrary value such as 1, 2, 5, 10, log N, N and so on. $G_i$ may be represented as Equation 4 below.

$$G_i = P_i^T \begin{bmatrix} T_{i,1} & 0 & \cdots & 0 \\ 0 & T_{i,2} & & \\ \vdots & & \ddots & \\ 0 & & & T_{i,\frac{N^2}{2}} \end{bmatrix} P_i \qquad \text{[Equation 4]}$$

Herein, $P_i(N^2 \times N^2)$ is a permutation matrix, and $T_{(i,j)}$ is a pairwise rotation matrix (i.e., Givens rotation matrix). That is, Givens rotation layer $G_i$ may be constructed by a combination of a permutation matrix and a rotation matrix. $T_{(i,j)}$ is described with reference to the following drawing.

Figure 6A:
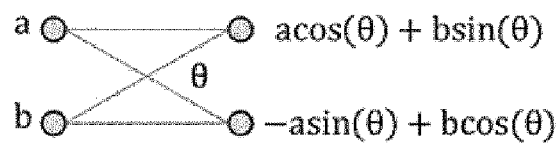
FIGS. 6A and 6B are diagrams illustrating an example to which a rotation matrix is applied as an embodiment to which the present invention is applied.
Figure 6B:
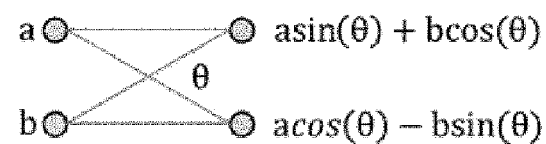

FIGS. 6A and 6B are diagrams illustrating an example to which a rotation matrix is applied as an embodiment to which the present invention is applied.

Referring to FIG. 6A, a rotation matrix $T_{(i,j)}$ may be represented as Equation 5 below.

$$T_{i,j} = \begin{bmatrix} \cos(\theta_{i,j}) & \sin(\theta_{i,j}) \\ -\sin(\theta_{i,j}) & \cos(\theta_{i,j}) \end{bmatrix} \qquad \text{[Equation 5]}$$

Referring to FIG. 6B, in an embodiment of the present invention, in order to permit a reflection together with a rotation (i.e., rotation plus reflection), $T_{(i,j)}$ as represented in Equation 6 below may be considered. That is, in an embodiment of the present invention, $T_{(i,j)}$ may form a pairwise rotation and a rotation plus reflection.

$$T_{i,j} = \begin{bmatrix} \sin(\theta_{i,j}) & \cos(\theta_{i,j}) \\ \cos(\theta_{i,j}) & -\sin(\theta_{i,j}) \end{bmatrix} \qquad \text{[Equation 6]}$$

Figure 7A:
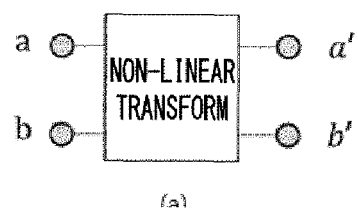
FIGS. 7A and 7B are diagrams illustrating an example of a transform to which the present invention is applied.
Figure 7B:
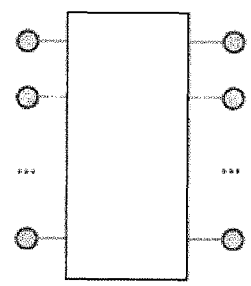

FIGS. 7A and 7B are diagrams illustrating an example of a transform to which the present invention is applied.

In an embodiment of the present invention, $T_{(i,j)}$ may be generated by a general 2-dimensional transform that receives two inputs and generates two outputs, as shown in FIG. 7A.

In addition, in an embodiment of the present invention, $T_{(i,j)}$ may be configured as a linear transform or a non-linear transform that has two or more dimension as shown in FIG. 7B.

Furthermore, the LGT of the present invention may include a linear transform or a non-linear transform that has 2-dimension or multi-dimension.

Using Equation 5 or Equation 6 described above, a rotation matrix $T_i$ may be represented as Equation 7 below.

$$T_i = \begin{bmatrix} T_{i,1} & 0 & \cdots & 0 \\ 0 & T_{i,2} & & \\ \vdots & & \ddots & \\ 0 & & & T_{i,\frac{N^2}{2}} \end{bmatrix} \quad \text{[Equation 7]}$$

With respect to a data vector x, a forward general transform (i.e., target transform H) may obtain a transform coefficient $c_{general}$ by using Equation 8 below.

$$c_{general} = H^T x \quad \text{[Equation 8]}$$

Meanwhile, the LGT may obtain an LGT transform coefficient $c_{LGT}$ by using Equation 9 below.

$$c_{LGT} = G^T x = P_0^T G_1^T \ldots G_M^T x \quad \text{[Equation 9]}$$

An inverse-transform of the transform coefficient generated by Equation 8 and Equation 9 may be performed by Equation 10 below.

$$x = Hc_{general}$$

$$x = Gc_{LGT} = G_M \ldots G_1 P_0 c_{LGT} \quad \text{[Equation 10]}$$

Figure 8A:
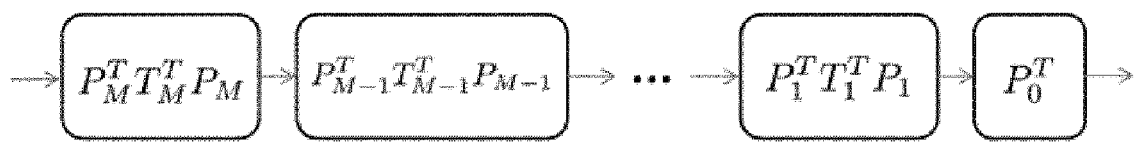
FIGS. 8A and 8B are diagrams illustrating a method of applying forward and reverse Layered Givens transform as an embodiment to which the present invention is applied.
Figure 8B:

FIGS. 8A and 8B are diagrams illustrating a method of applying forward and reverse Layered Givens transform as an embodiment to which the present invention is applied.

Referring to FIG. 8A, an encoder may apply a forward LGT transform, and may obtain an LGT transform coefficient. Particularly, as shown in FIG. 8A, the encoder may apply a rotation layer and a permutation layer sequentially to an input data x, and may obtain an LGT transform coefficient.

Referring to FIG. 8B, encoder/decoder may reconstruct x by applying reverse LGT transform to the LGT transform coefficient. Particularly, as shown in FIG. 8B, the decoder may apply a rotation layer and a permutation layer sequentially to the LGT transform coefficient, and may reconstruct (or obtain) x.

Figure 9:
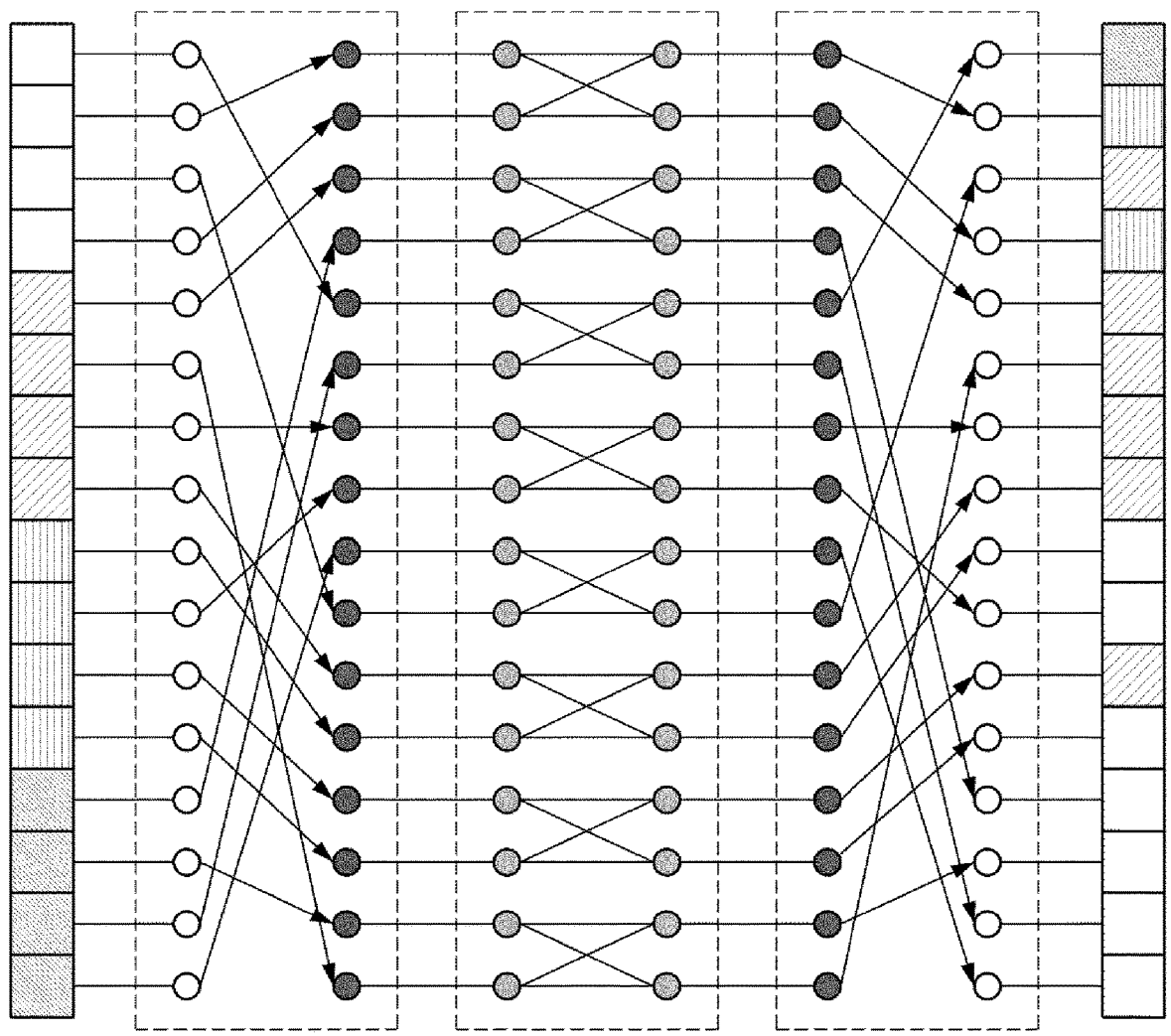
FIG. 9 is a diagram illustrating a method of applying a rotation layer as an embodiment to which the present invention is applied.

FIG. 9 is a diagram illustrating a method of applying a rotation layer as an embodiment to which the present invention is applied.

Referring to FIG. 9, a Givens rotation layer $G_i$ may be constructed by a combination of a permutation matrix and a rotation matrix. Encoder/decoder may apply a permutation matrix in order to apply a pairwise rotation efficiently. The encoder/decoder may apply a rotation matrix to shuffled data, and then may reverse-shuffle the data.

In an embodiment of the present invention, target transform H may be KLT, Sparse Orthonormal Transform (SOT), curvelet transform, contourlet transform or complex wavelet transform.

Design of Layered Givens Transform (LGT)

When target transform H is given, the Layered Givens Transform G may be designed by using Equation 11 below.

$$\min_G \|H - G\|_F \quad \text{[Equation 11]}$$

Herein, $\|.\|_F$ represents Frobenius norm. Equation 11 relates to an optimization problem of G which is matched to target transform H. When $Tr\{A\}$ is referred to as a trace of matrix A, Equation 11 above may be represented as Equation 12 below. Herein, a trace represents a summation of diagonal components.

$$\|H-G\|_F^2 = Tr\{H^T H\} - 2Tr\{H^T G\} + Tr\{G^T G\} \quad \text{[Equation 12]}$$

As assumed above, since H and G are orthonomal, Equation 12 may be arranged as Equation 13.

$$\|H-G\|_F^2 = 2N^2 - 2Tr\{H^T G\} \quad \text{[Equation 13]}$$

Weight vector w that has a positive element is accepted, and a general minimization may be obtained. Here, weight vector represents an importance of each basis vector (i.e., each column of H). Herein, the importance may be determined according to frequency of each component. Accordingly, when weight vector w is considered, the minimization problem of Equation 11 may be represented as Equation 14 below.

$$\min_G \|(H - G)W\|_F \quad \text{[Equation 14]}$$

Herein, weight matrix W ($N^2 \times N^2$) may be represented as Equation 15 below.

$$W(k, l) = \begin{cases} w^{1/2}(k), & k = l \\ 0, & k \neq l \end{cases} \quad \text{[Equation 15]}$$

The optimization problem of Equation 11 or Equation 14 may be concluded to an optimization problem of each of the layers that construct the Layered Givens Transform. Hereinafter, a method of determining (or deriving) a permutation layer $P_0$ will be described.

Using a trace property, Equation 14 may be arranged as Equation 16 below.

[Equation 16]
$$\|(H - G)W\|_F^2 = 2Tr\{W^T W\} - 2Tr\{W^T H^T G_M G_{M-1} \ldots G_1 P_0 W\}$$
$$= 2Tr\{W^T W\} - 2Tr\{WW^T H^T G_M G_{M-1} \ldots G_1 P_0\}$$

In this case, it is assumed that the other variables except $P_0$ are fixed. A minimization problem of Equation 16 is a maximization problem of $2Tr\{WW^T H^T G_M G_{M-1} \ldots G_1 P_0\}$. At this moment, $P_0$ may be determined by using Hungarian algorithm. This will be described with reference to the following drawing.

Figure 10:
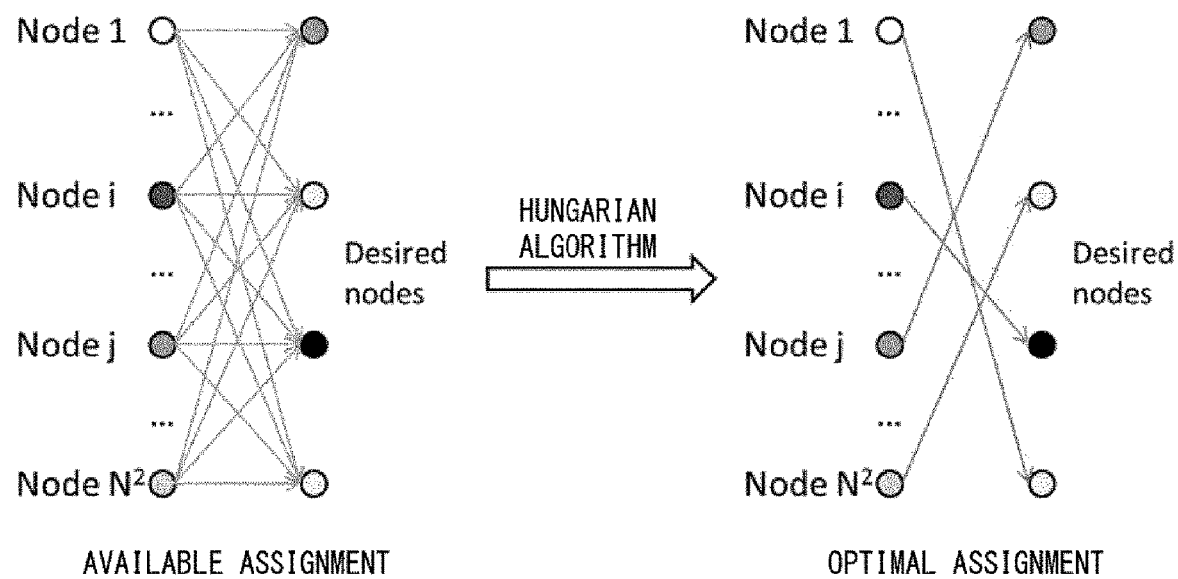
FIG. 10 is a diagram illustrating a method of determining a permutation layer using Hungarian algorithm as an embodiment to which the present invention is applied.

FIG. 10 is a diagram illustrating a method of determining a permutation layer using Hungarian algorithm as an embodiment to which the present invention is applied.

Referring to FIG. 10, by using Hungarian algorithm, encoder/decoder may determine an optimal assignment in which each node is not overlapped. Particularly, in Equation 16 above, $2Tr\{WW^T H^T G_M G_{M-1} \ldots G_1 P_0\}$ represents a summation of a diagonal matrix of $WW^T H^T G_M G_{M-1} \ldots G_1 P_0$. The encoder/decoder may calculate an optimal assignment that maximizes the $WW^T H^T G_M G_{M-1} \ldots G_1 P_0$ through Hungarian method.

In an embodiment of the present invention, blossom method may be used for designing a permutation matrix.

Hereinafter, a method of determining a Givens rotation layer $G_i$ will be described.

As described in Equation 3 above, the Layered Givens Transform G may be constructed by a combination of a Givens rotation layer and a permutation layer. At this moment, G may include one or more Givens rotation layers. In order to optimize $i^{th}$ Givens rotation layer $G_i$ among a plurality of Givens layers, Equation 14 described above may be arranged as Equation 17 below.

$$\begin{aligned} \|(H-G)W\|_F^2 &= \|HW - G_M G_{M-1} \ldots G_i \ldots G_1 P_0 W\|_F^2 \\ &= \|G_{i+1}^T \ldots G_M^T HW - G_i G_{i-1} \ldots G_1 P_0 W\|_F^2 \\ &= \|\hat{H}_i - G_i R_i\|_F^2 \\ &= Tr\{\hat{H}_i^T \hat{H}_i\} - 2Tr\{\hat{H}_i^T G_i R_i\} + Tr\{R_i^T R_i\} \end{aligned}$$ [Equation 17]

Herein, $\hat{H}_i = G_{i+1}^T \ldots G_M^T HW$ and $R_i = G_{i-1} \ldots G_1 P_0 W$. $G_i$ selects a pair of rows in $R_i$, and rotates the selected pair for matching a pair of co-located rows in $\hat{H}_i$. Optimal $G_i$ may be determined by selecting an optimal pair and an optimal rotational angle that minimize Equation 17. First, encoder/decoder may calculate an optimal rotational angle of each pair by setting a pair gain, and may determine pairs that maximize a summation of the pair gains. A method of determining a rotational angle through setting of a pair gain is described first.

It is assumed that $G_i$ selects rows p and q as the $j^{th}$ pair to be rotated by $T_{(i,j)}$. In addition, $r_{(i,p)}$ and $r_{(i,q)}$ determine rows p and q of $R_i$, and $h_{(i,p)}$ and $h_{(i,q)}$ determine rows p and q of $\hat{H}_i$. Based on this, Equation 17 described above may be represented as Equation 18 below.

$$\left\| \begin{bmatrix} h_{i,p} \\ h_{i,q} \end{bmatrix} - \begin{bmatrix} \cos(\theta_{i,j}) & \sin(\theta_{i,j}) \\ -\sin(\theta_{i,j}) & \cos(\theta_{i,j}) \end{bmatrix} \begin{bmatrix} r_{i,p} \\ r_{i,q} \end{bmatrix} \right\|_F^2 =$$ [Equation 18]

$$\|h_{i,p}\|^2 + \|h_{i,q}\|^2 + \|r_{i,p}\|^2 + \|r_{i,q}\|^2 -$$
$$2\cos(\theta_{i,j})(h_{i,p} r_{i,p}^T + h_{i,q} r_{i,q}^T) - 2\sin(\theta_{i,j})(h_{i,p} r_{i,q}^T - h_{i,q} r_{i,p}^T)$$

An optimal rotational angle $\theta_{(i,j)}$ may be determined as a value that minimizes Equation 18. A part of mathematical expression of Equation 18 may be defined as $c_{(i,p,q)}$ and $s_{(i,p,q)}$ as represented in Equation 19 below.

$$c_{i,p,q} = h_{i,p} r_{i,p}^T + h_{i,q} r_{i,q}^T$$
$$s_{i,p,q} = h_{i,p} r_{i,q}^T - h_{i,q} r_{i,p}^T$$ [Equation 19]

When $G_i$ selects rows p and q, an optimal rotational angle $\theta_{(i,j)}$ satisfies Equation 20 below.

$$\cos(\theta_{i,j}) = c_{i,p,q}/(c_{i,p,q}^2 + s_{i,p,q}^2)^{1/2}, \sin(\theta_{i,j}) = s_{i,p,q}/(c_{i,p,q}^2 + s_{i,p,q}^2)^{1/2}$$ [Equation 20]

Using Equations 19 and 20, Equation 18 may be arranged as Equation 21. Particularly, when cosine value and sin value for the optimal rotational angle $\theta_{(i,j)}$ represented in Equation 20 are substituted by Equation 18 and the relation formula of Equation 19 is applied to Equation 18, a minimum value for Equation 18 may be obtained as represented in Equation 21 below.

$$\|h_{i,p}\|^2 + \|h_{i,q}\|^2 + \|r_{i,p}\|^2 + \|r_{i,q}\|^2 - 2(c_{i,p,q}^2 + s_{i,p,q}^2)^{1/2}$$ [Equation 21]

That is, when rows p and q are rotated as much as an optimal rotational angle as a pair for obtaining optimal $G_i$, as represented in Equation 21, an error value may be decreased as much as $2(c_{i,p,q}^2 + s_{i,p,q}^2)^{1/2}$. Accordingly, a pair gain for Givens rotation may be defined as Equation 22 below. Here, the pair gain for Givens rotation represents an error value that may be decreased through Givens rotation.

$$gain(i,p,q) = (c_{i,p,q}^2 + s_{i,p,q}^2)^{1/2}$$ [Equation 22]

The pair gain for the case of the rotation plus reflection may be obtained by exchanging $r_{(i,p)}$ with $r_{(i,q)}$ each other in Equation 18 or 19 described above. In this case, the final pair gain gain(i,p,q) may be determined (or configured) as a gain that has a maximum value between two pair gains that are calculated in the case of a rotation and the case of rotation plus reflection.

As an embodiment of the present invention, the pair gain gain(i,p,q) may be modified by considering a calculation complexity and a memory complexity. For example, the pair gain may be calculated by using $2(c_{i,p,q}^2 + s_{i,p,q}^2)$ instead of $2(c_{i,p,q}^2 + s_{i,p,q}^2)^{1/2}$ in Equation 22.

As an embodiment of the present invention, the pair gain gain(i,p,q) may be calculated by considering only a limited set of $\theta_{(i,j)}$. For example, encoder/decoder may consider $\theta_{(i,j)}$ that satisfies $\theta_{i,j} \in \{\varphi_1, \varphi_2, \ldots, \varphi_K\}$, instead of all $\theta_{(i,j)}$ that satisfy $0 \leq \theta_{i,j} < 2$. Herein, $\varphi_k$ may be each distinguished angle that satisfies $0 \leq \varphi_k < 2\pi$. Based on such $\theta_{(i,j)}$, $\theta_{(i,j)}$ may be determined, which minimizes Equation 18 described above. For example, $\varphi_k$ may be $k^*(2\pi/m)$, and herein, m may be the number of entire angles.

As an embodiment of the present invention, the pair gain gain(i,p,q) may be calculated by permitting a specific pair (or limited pair) p and q. For example, in order to restrict memory access, cache miss, and the like, the pair gain may be modified as represented in Equation 23.

$$gain(i, p, q) = \begin{cases} gain(i, p, q) & |p - q| \leq \Delta \\ -\infty & \text{otherwise} \end{cases}$$ [Equation 23]

Herein, $\Delta$ is an arbitrary value, for example, may have a value such as 1, 10, 17, 123, 1024, 2048, and so on. Further, for example, the pair gain may be calculated by using Equation 24 below.

$$gain(i, p, q) = \begin{cases} gain(i, p, q) & f(p - q) \leq \Delta \\ -\infty & \text{otherwise} \end{cases}$$ [Equation 24]

Herein, f(p,q) may correspond to a general function.

Next, encoder/decoder may determine total pairs that maximize a summation of pair gains, and accordingly, may derive an optimal Givens rotation layer $G_i$.

An optimization of $G_i$ may be attained by maximizing the summation of pair gains for all nonintersecting pairs. This may be concluded to a problem of a maximum matching in a graph theory.

In this case, it is assumed that indexes of $N^2$ rows are determined to be vertexes of a graph. Further, it is assumed that the pair gain gain(i,p,q)=gain(i,e) of Equation 22 above is a weight of edge e(e={p,q}) in the entire edge set E of a graph.

Encoder/decoder may determine an edge set Ω that satisfies the condition that a vertex corresponds to an edge among E, that is, a vertex is not overlapped in several edges. This may be represented as Equation 25 below.

$$\max_{\Omega \subset E} \Sigma_{e_k \in \Omega} \text{gain}(i, e_k) \text{ such that } e_k \cap e_l = \emptyset,$$
$$\forall e_k, e_l \in \Omega, k \neq 1$$
[Equation 25]

Herein, $e_k$ and $e_l$ represent edges in the entire edge set E. Referring to Equation 25, edges may be determined such that total summation of the pair gain of edges becomes a maximum in edge Ω in which each vertex corresponds to an edge. Such a maximum matching problem may be solved by using Blossom algorithm. This is described with reference to the drawing below.

Figure 11:
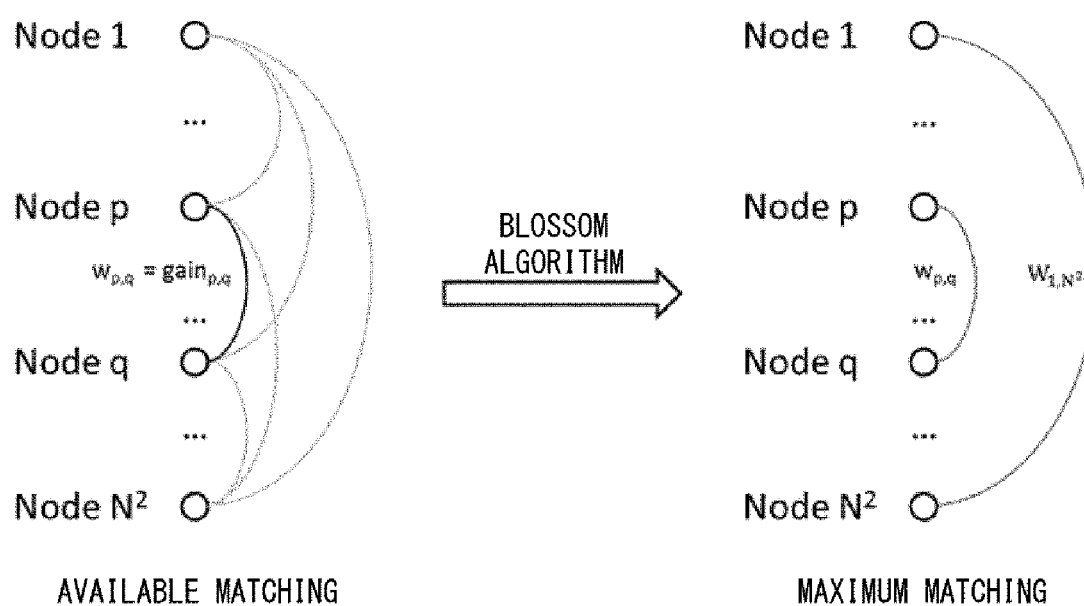
FIG. 11 is a diagram illustrating a method of determining a rotation layer using Blossom algorithm as an embodiment to which the present invention is applied.

FIG. 11 is a diagram illustrating a method of determining a rotation layer using Blossom algorithm as an embodiment to which the present invention is applied.

Referring to FIG. 11, encoder/decoder may find a maximum matching pair of edges that are not overlapped by using the Blossom algorithm. In other words, the encoder/decoder may determine the edges in which total pair gain (or weight) of edges not overlapped becomes a maximum by using the Blossom algorithm.

The encoder/decoder may determine optimal $N^2/2$ pairs by using the method described above, and may calculate $T_{(i,j)}$ based on an optimal rotational (or rotation plus reflection) angle of each pair. Through this, an optimal $G_i$ is derived.

Design Algorithm of Layered Givens Transform (LGT)

As a solution of the LGT design problem of Equation 14 described above, the present invention proposes an algorithm for designing the Layered Givens Transform that approximates to a target transform.

Figure 12:
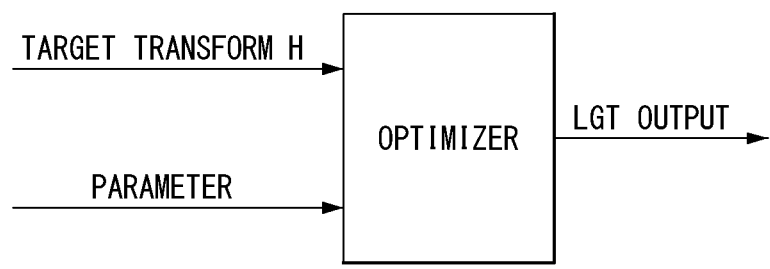
FIG. 12 is a conceptual diagram for describing an optimization method of the Layered Givens Transform as an embodiment to which the present invention is applied.

FIG. 12 is a conceptual diagram for describing an optimization method of the Layered Givens Transform as an embodiment to which the present invention is applied.

Referring to FIG. 12, an optimizer of the Layered Givens Transform outputs an optimized LGT using parameters related to target transform H (or desired transform H) as an input. The optimizer may be implemented as a component which is included in an encoder and a decoder.

The algorithm for designing the Layered Givens Transform may include six algorithms (or processes) below.

The first is an optimization algorithm of a permutation layer $P_0$.

TABLE 1

| 1. | Use Hungarian method to minimize (equation 16) in terms of $P_0$. |
|---|---|

Table 1 above represents an example of the optimization algorithm of $P_0$. Particularly, 1. $P_0$ that minimizes Equation 16 is determined by using Hungarian method.

The second is an optimization algorithm of Givens rotation layer $G_i$.

TABLE 2

| 1. | Calculate pair gains gain(i, p, q) for all possible pairings. |
|---|---|
| 2. | Use Blossom method to maximize (equation 25) in terms of matchings. |
| 3. | Use the optimal pairs to construct $P_i$, optimal $T_{i,j}$, and $G_i$. |

Table 2 above represents an example of the optimization algorithm of $G_i$. Particularly, 1. Pair gain gain(i,p,q) for all available pairs is calculated.
2. Optimal pairs that do not overlap Equation 25 as much as possible are determined by using the Blossom method.
3. Optimal $T_{(i,j)}$ and $G_i$ are configured by using the optimal pairs.

The third is Descent algorithm. In the Descent algorithm, the optimization algorithm of $P_0$ described above is called, and an optimal layer matched to target transform H is derived by changing the Givens rotation layer. The Descent algorithm may use an initial LGT $G_0$ as an input. Otherwise, it is assumed that an initial LGT $G_0$ is given.

TABLE 3

| 1. | Set m = 0, err(0) = $\|(H - G^0)W\|_F^2$ |
|---|---|
| 2. | 1. Repeat |
|   |   a. m = m + 1 |
|   |   b. Optimize $P_0$ |
|   |   c. Update $P_0$ in $G^{m-1}$ to construct candidate $G_c^{m,0}$ |
|   |   d. calculate updated error $\text{err}_0(m) = \|(H - G_c^{m,0})W\|_F^2$ |
|   |   e. for k = 1: M |
|   |     i. Optimize $G_k$ |
|   |     ii. Update $G_k$ in $G^{m-1}$ to construct candidate $G_c^{m,k}$ |
|   |     iii. Calculate updated error $\text{err}_k(m) = \|(H - G_c^{m,k})W\|_F^2$ |
|   |   end for |
|   |   f. k' = $\min_k \{\text{err}_k(m)\}$ |
|   |   g. $G^m = G_c^{m,k'}$ |
|   |   h. err(m) = $\text{err}_{k'}(m)$. |
|   | Until err(m − 1) − err(m) < ε |
| 3. | Output G = $G^m$ |

Table 3 above represents an example of the Descent algorithm. Particularly,

1. An initial value is set as represented in Equation 26 below.

$$m=0, \text{err}(0)=\|(H-G^0)W\|_F^2$$
[Equation 26]

Herein, m represents a count of performing iteration for finding an optimal value as a variable for counting. Further, function err( ) represents a matching error for the target transform. As err( ) value decreases, an approximation for the target transform may increase.

2. The following step is iterated until Equation 27 below is satisfied.

$$\text{err}(m-1)-\text{err}(m)<\in$$
[Equation 27]

Herein, ∈ is a small enough value, and represents a threshold value. As ∈ becomes greater, an optimal value may be found with smaller iteration counts (i.e., converged fast). As ∈ becomes smaller, a degree of approximation for the target transform may increase.

(1) m is increased by 1. That is, m is set by m+1 value.
(2) $P_0$ is optimized. In this case, the optimization algorithm of $P_0$ described above may be performed.
(3) LGT candidate $G_c^{m,0}$ is constructed by updating $P_0$ in $G^{m-1}$ by using the optimized $P_0$. That is, in $G^{m-1}$, $G_c^{m,0}$ which is updated from $P_0$ is used. In this case, $G^{m-1}$ is not changed.
(4) Error $\text{err}_0(m)$ for $G_c^{m,0}$ is calculated by using Equation 28 below.

$$\text{err}_0(m)=\|(H-G_c^{m,0})W\|_F^2$$
[Equation 28]

(5) Following steps a), b) and c) are repeated until k becomes m from 1.

a) $G_k$ is optimized. In this case, the optimization algorithm of $P_0$ described above may be performed.

b) Candidate $G_c^{m,k}$ is constructed by updating $G_k$ in $G^{m-1}$ by using the optimized $G_k$. That is, in $G^{m-1}$, $G_c^{m,k}$ which is updated from $G_k$ is used. In this case, $G^{m-1}$ is not changed.

c) Error $\text{err}_k(m)$ for $G_c^{m,k}$ is calculated by using Equation 29 below.

$$\text{err}_k(m) = \|(H - G_c^{m,k})W\|_F^2 \quad [\text{Equation 29}]$$

(6) k' is set to k that minimizes an error value by using Equation 30 below.

$$k' = \min_k\{\text{err}_k(m)\} \quad [\text{Equation 30}]$$

(7) $G^m$ is set to $G_c^{m,k'}$.

(8) Error $\text{err}(m)$ is set to $\text{err}_{k'}(m)$.

3. Layered Givens Transform G is set to $G^m$.

The fourth is a random neighbor discovery algorithm. In the random neighbor discovery algorithm, a part of layers is set to a random value and the Descent algorithm described above is called in order to determine an optimal value more efficiently. The random neighbor discovery algorithm may set G as an input. Otherwise, it is assumed that G is given.

TABLE 4

| | |
|---|---|
| 1. | Randomly select M/2 + 1 layers in G |
| 2. | Set the selected layers in G to identity matrix to construct $G_{init'}$ |
| 3. | G' = descent algorithm($G_{init'}$) |
| 4. | Return G' |

Table 4 above represents an example of the random neighbor discovery algorithm. Particularly, 1. M/2+1 layers are randomly selected in G. However, the number of selected layers is just an example, but the present invention is not limited thereto.

2. $G_{init'}$ is constructed by setting the selected layers as an identity matrix.

3. G' is set as an output of the Descent algorithm that has $G_{init'}$ as an input.

4. G' is returned.

The fifth is a simulated annealing algorithm. In the simulated annealing algorithm, the random neighbor discovery algorithm is called. An optimal value is found while a solution (i.e., new optimal value) derived by applying the random neighbor discovery algorithm is compared with the existing solution repeatedly. The simulated annealing algorithm may have an initial LGT $G_0$ as an input. Otherwise, it is assumed that an initial LGT $G_0$ is given.

TABLE 5

| | |
|---|---|
| 1. | Set m = 0, err(0) = $\|(H - G^0)W\|_F^2$ |
| 2. | G(cur) = $G^0$, err(cur) = err(0) |
| 3. | Repeat |
| | a. m = m+1 |
| | b. $G^m$ = find random neighbor(G(cur)) |
| | c. Calculate err(m) = $\|(H - G^m)W\|_F^2$ |
| | d. accept = decide acceptance(err(m), err(cur), m) |
| | e. if(accept) |
| | G(cur) = $G^m$, err(cur) = err(m) |
| | end if |
| | Until m > maximum number of iterations |
| 4. | Output G = G(cur) |

Table 5 above represents an example of the simulated annealing algorithm. Particularly, 1. An initial value is set as represented in Equation 31 below.

$$m=0,\ \text{err}(0) = \|(H - G^0)W\|_F^2 \quad [\text{Equation 31}]$$

2. A current Layered Givens Transform G(cur) is set to $G^0$, and a current error err(cur) is set to err(0).

3. Following steps a), b), c), d) and e) are iterated until m is greater or equals to a maximum iteration count.

a) m is increased by 1. That is, m is set by m+1 value.

b) $G^m$ is set as an output of the random neighbor discovery algorithm that has G(cur) as an input.

c) Error err(m) for $G^m$ is calculated by using Equation 32 below.

$$\text{err}(m) = \|(H - G^m)W\|_F^2 \quad [\text{Equation 32}]$$

d) A variable 'accept' that represents whether to accept is set as an output of an acceptance determination algorithm that has err(m), err(cur) and m as inputs. The acceptance determination algorithm will be described below.

e) G(cur) is set to $G^m$ when accept value is 1, and err(cur) is set to err(m).

4. G(cur) is outputted.

The sixth is an acceptance determination algorithm. In the acceptance determination algorithm, it is determined whether to select a newly obtained solution (i.e., an optimal value) based on probability. The acceptance determination algorithm may set err(m), err(cur) and iteration count m as inputs. Otherwise, it is assumed that err(m), err(cur) and iteration count m are given.

TABLE 6

| | |
|---|---|
| 1. | Calculate current temperature t by m, e.g., $t = \log\left(\dfrac{\text{MAX\_ITER\_COUNT}}{m}\right)$ |
| 2. | Determine acceptance probability p by err(m), err(cur) and t, e.g., p = exp((err(cur) − err(m))/t) |
| 3. | Generate Bernoulli random variable A ~ Ber(p) |
| 4. | If A = 1, return accept; else, return reject. |

Table 6 above represents an example of the acceptance determination algorithm. Particularly, 1. Current temperature t is calculated based on m. For example, t may be calculated by using Equation 33 below.

$$t = \log\left(\frac{\text{MAX\_ITER\_COUNT}}{m}\right) \quad [\text{Equation 33}]$$

Herein, MAX_ITER_COUNT represents a maximum iteration count. As the iteration count m increases, value t may decrease.

2. Acceptance probability p is determined based on err(m), err(cur) and t.

For example, p may be calculated by using Equation 34 below.

$$p = \min\left\{1,\ \exp\left(\frac{\text{err}(cur) - \text{err}(m)}{t}\right)\right\} \quad [\text{Equation 34}]$$

Referring to Equation 34, in the case that the error value (err(m)) according to newly obtained through the random neighbor discovery algorithm is greater than the error value (err(cur)) for the optimal value obtained before and/or in the case that t value is smaller, the probability of not being accepted may be increased.

3. Bernoulli random variable A is generated based on the determined acceptance probability p.

4. When A is 1, accept is returned, otherwise, reject is returned. Otherwise, A is set as an accept value.

Figure 13:
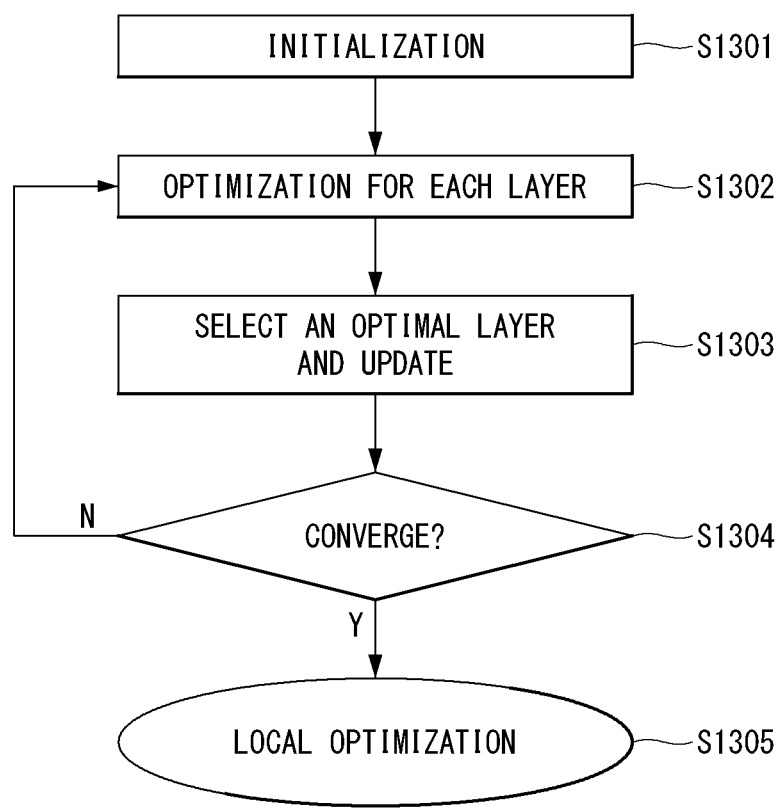
FIG. 13 and FIG. 14 are flowcharts for describing an algorithm for designing the Layered Givens Transform as an embodiment to which the present invention is applied.
Figure 14:
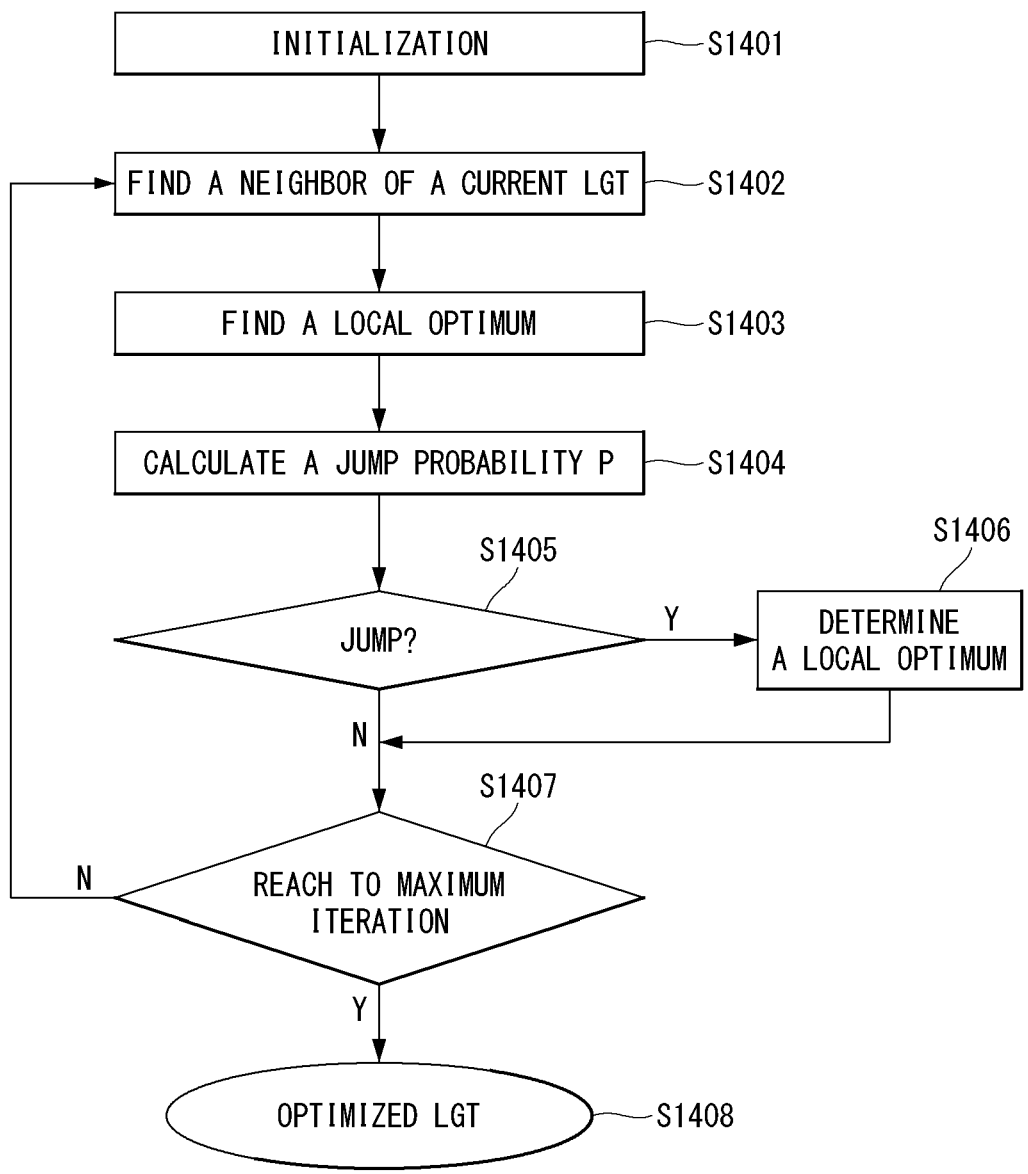

FIG. 13 and FIG. 14 are flowcharts for describing an algorithm for designing the Layered Givens Transform as an embodiment to which the present invention is applied.

The Descent algorithm described above may be performed through the steps shown in FIG. 13.

Encoder/decoder performs an initialization (step, S1301).

By using Equation 26 above, variable m that represents the number of iteration and function err( ) that represents a matching error for a target transform are initialized. The function err( ) may be initialized by using an initial LGT which is given.

The encoder/decoder performs an optimization for each layer that constructs the LGT individually (step, S1302).

As described above, the encoder/decoder may derive an optimal layer which is matched to target transform H while a layer is changed one by one.

The encoder/decoder updates the LGT by using the optimal layer which is selected in step S1302 (step, S1303).

The encoder/decoder determines whether an error value is converged based on the updated LGT (step, S1304).

As a result of the determination in step S1304, the error value is not converged, step S1302 is performed again, and then, iteration is performed until the error value becomes converged (step, S1305).

As a result of the determination in step S1305, the error value is converged, the determined optimal LGT is determined as a local optimum.

Although the optimized LGT is able to be obtained by the Descent algorithm described above, since several layers are not optimized at a time but the optimization and update are performed by each layer, there is a limitation that the optimal LGT is unable to reach a global optimum of which approximation for the target transform is higher than the local optimum but converged. Such a limitation may be overcome by performing the simulated annealing algorithm. The simulated annealing algorithm described above may be performed with the steps shown in FIG. 14.

The encoder/decoder performs an initialization (step, S1401). This may be performed in the same way as step S1301 of FIG. 13 above.

The encoder/decoder finds a neighbor of a current LGT (step, S1402). In this case, the random neighbor discovery algorithm described above may be performed.

The encoder/decoder finds a local optimum based on the discovered neighbor (step, S1403). That is, the encoder/decoder determines a new local optimum based on the layers initialized through the random neighbor discovery algorithm. In this case, the Descent algorithm described above in FIG. 12 may be performed.

The encoder/decoder calculates a jump probability p (step, S1404) and determines whether to set a current local optimum as the local optimum found in step S1403 (step, S1405). Here, the jump may mean an adoption of the newly obtained local optimum, and the jump probability p may be determined based on a current iteration count and a maximum iteration count. In this case, the acceptance determination algorithm described above may be performed.

As a result of the determination in step S1405, when the jump (or acceptance) is determined, the encoder/decoder set a current LGT as the local optimum found in step S1403 (step, S1406).

The encoder/decoder repeatedly performs the steps from S1402 to S1406 sequentially until the iteration count reaches to a maximum iteration count (step, S1407).

When the current iteration count reaches to the maximum iteration count, the encoder/decoder determines the current LGT as the optimal LGT (step, S1408).

The present invention proposes a method of designing the Layered Givens Transform of which approximation is higher than the target transform.

The present invention proposes a method of increasing the approximation for the target transform of the Layered Givens Transform (LGT) by applying a permutation matrix additionally behind the last Givens rotation layer.

The present invention proposes a method of applying Hungarian method for determining a permutation matrix by using an absolute value operator.

Embodiment 1

According to the Layered Givens Transform (LGT) designing method described above, the LGT may be generated by multiplying $G_i$ matrix in a left side starting from a permutation matrix $P_0$ as represented in Equation 3.

The present invention proposes a method of applying a permutation matrix (or a permutation layer) additionally after the last $G_i$ (i=1, 2, ..., M) layer. That is, permutation matrix Q may be applied in the last layer (or step) after $G_M$ as represented in Equation 35 below.

$$G = QG_M G_{M-1} \ldots G_1 P_0 = QG_{int} P, \text{ where } P = P_0 \text{ and } G_{int} = G_M G_{M-1} \ldots G_1 \quad \text{[Equation 35]}$$

By using Equation 35 and the trace property, the optimization problem of Equation 14 described above may be arranged as Equation 36 below.

$$\min_G \|(H - G)W\|_F^2 = \quad \text{[Equation 36]}$$
$$\min_G (Tr(WW^T) + Tr(WW^T H^T H) - 2Tr(PWW^T H^T QC_{int}))$$

The minimization problem of Equation 36 above may be concluded to the maximization problem of $2Tr(PWW^T H^T QG_{int})$. Accordingly, permutation matrix Q may be determined by using Equation 37 below.

$$Q^* = \underset{Q}{\mathrm{argmax}} Tr(PWW^T H^T QG_{int}) \quad \text{[Equation 37]}$$
$$= \underset{Q}{\mathrm{argmax}} Tr(G_{int} PWW^T H^T Q)$$
$$= \underset{Q}{\mathrm{argmax}} Tr(\tilde{G}^T \tilde{H} Q),$$

where, for example, $\tilde{G} = (G_{int} P)^T$ and $\tilde{H} = WW^T H^T$

Referring to Equation 37, the optimization problem of permutation matrix Q is concluded to an assignment problem between column vector of $\tilde{G}$ and column vector of $\tilde{H}$. The encoder/decoder may find the optimal solution $Q^*$ of the assignment problem by applying the Hungarian method.

Likewise, the Hungarian method may also be applied to the case of finding $P^*$ of Equation 38 below.

$$P^* = \underset{P}{\operatorname{argmax}} Tr(PWW^T H^T QG_{init}) \quad \text{[Equation 38]}$$

$$= \underset{P}{\operatorname{argmax}} Tr(WW^T H^T QG_{int} P)$$

$$= \underset{P}{\operatorname{argmax}} Tr(\tilde{H}^T \tilde{G} Q),$$

where, for example, $$\tilde{G} = G_{int} \text{ and } \tilde{H} = (WW^T H^T Q)^T$$

Referring to Equation 38, the optimization problem of permutation matrix P is resulted in the assignment problem between column vector of $\tilde{H}$ and column vector of $\tilde{G}$. The encoder/decoder may find the optimal solution P* of the assignment problem by applying the Hungarian method.

Using a permutation matrix as a front and a rear layer among the layers included in the Layers Givens Transform, and accordingly, an approximation to the target transform may be more increased, and a compression performance of an image may be improved.

Embodiment 2

The present invention proposes a method of applying the Hungarian method for determining a permutation matrix by using an absolute value operator.

When applying the Hungarian method for finding an optimal assignment between a column vector of G and a column vector of H, for example, input J of the Hungarian algorithm (or routine) may be defined as Equation 39 below.

$$J = G^T H \quad \text{[Equation 39]}$$

However, the present invention is not limited thereto, but input J may be modified according to the Hungarian algorithm.

The present invention proposes a method of using J calculated Equation 40 below as an input of the Hungarian algorithm.

$$J = |G^T H| \quad \text{[Equation 40]}$$

Herein, |.| represents an absolute value operator for each element.

In the case that $G^T H$ matrix is input into the Hungarian algorithm without any change (in this case, a cost matrix may become—$G^T H$), an element of the corresponding matrix may have the negative sign. In the case that there is an element having the negative sign while an absolute value is great in $G^T H$ matrix, except the fact that directions of the corresponding basis vector pair (a basis vector of G and a basis vector of H) are opposite with each other, although the situation that matching is well made since an absolute value of scalar product is great, a phenomenon may occur that the value of the corresponding cost value is regarded as a great value and excluded from matching.

Accordingly, by taking an absolute value in the input of the Hungarian algorithm as represented in Equation 40, the problem above may be solved, and an optimal solution may be found by considering the case that directions of basis vector pair are opposite. Through this, the convergence speed of the LGT design algorithm described above may become faster and it is available to design the LGT which is more closely approximate to the target transform in the aspect of encoding/decoding.

Therefore, using matrix J of Equation 40 above, the problem of finding an optimal assignment may be arranged as Equation 41 below.

$$P^* = \underset{P}{\operatorname{argmax}} Tr(|G^T HP|) \quad \text{[Equation 41]}$$

By applying Equation 41 above to Equation 37 and Equation 38 described above, the problem of finding an optimal assignment may be represented as Equation 42 below.

$$P^* = \underset{P}{\operatorname{argmax}} Tr(|\tilde{H}^T \tilde{G} P|), \text{ where, for example,} \quad \text{[Equation 42]}$$

$$\tilde{G} = G_{int} \text{ and } \tilde{H} = (WW^T H^T Q)^T$$

$$Q^* = \underset{Q}{\operatorname{argmax}} Tr(|\tilde{G}^T \tilde{H} Q|), \text{ where, for example,}$$

$$\tilde{G} = (G_{int} P)^T \text{ and } \tilde{H} = WW^T H^T$$

Owing to the rotational angle determined by a rotation layer (or rotation matrix), an element (or vector) of a matrix input to the Hungarian algorithm may have the negative sign. When there is an element having the negative sign, there is a problem that the cost calculated for deriving an optimal assignment has a negative value.

Accordingly, by taking an absolute value in an input of the Hungarian algorithm, such a problem may be solved and an optimal solution may be found considering all possibilities including the negative sign. Through this, the convergence speed of the LGT design algorithm described above may become faster and it is available to design the LGT which is more closely approximate to the target transform.

Embodiment 1 and embodiment 2 described so far may be independently applied or embodiment 1 and embodiment 2 may be applied in combination. For example, the encoder/decoder may apply a permutation matrix behind the last Givens rotation layer additionally, and may apply the Hungarian method by using an absolute value operator in order to determine the permutation matrix.

Figure 15:
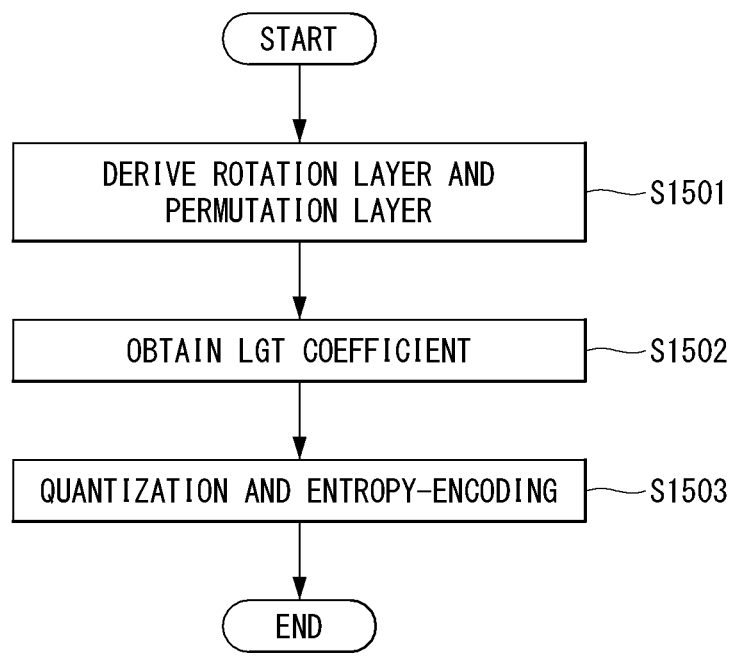
FIG. 15 is a flowchart for describing a procedure of performing an encoding by using the Layered Givens Transform as an embodiment to which the present invention is applied.

FIG. 15 is a flowchart for describing a procedure of performing an encoding by using the Layered Givens Transform as an embodiment to which the present invention is applied.

An encoder derives at least one rotation layer, a first permutation layer and a second permutation layer based on a given transform matrix H and an error parameter (step, S1501). As described above, the first permutation layer and the second permutation layer may include a permutation matrix which is obtained by permuting (or substituting) a row of an identity matrix. The permutation matrix may be obtained by performing a process of selecting and exchanging two rows starting from an identity matrix by one time or a plurality of times.

For example, the first permutation layer may be P in Equation 34 described above, and the second permutation layer may be Q in Equation 35.

In addition, the rotation layer may include a permutation matrix and a rotation matrix, and the rotation matrix may include at least one pairwise rotation matrix.

As described above, the pairwise rotation matrix may be formed by considering a pairwise rotation as represented in Equation 5 described above, and may also be formed by considering pairwise rotation plus reflection as represented in Equation 6 described above.

Further, the error parameter represents a variable or a matrix for calculating an approximation for the target transform, and may also be referred to as 'error calculation method' or 'weight matrix', or the like. The error parameter may be determined based on Equations 11, 14, 26 or 36.

As described in FIG. 10 above, the first permutation layer or the second permutation layer may be derived through an optimization procedure, and the optimization procedure may be performed based on matching the Layered Givens Transform (LGT) matrix with the given transform matrix H. Herein, the Layered Givens Transform (LGT) matrix may be derived from the rotation layer, the first permutation layer or the second permutation layer by using Equation 35 described above. In addition, the optimization procedure of the first permutation layer or the second permutation layer may be performed by using the Hungarian algorithm. Particularly, the encoder may determine an optimal assignment which is not overlapped among nodes by using Equation 16, 36, 37 or 38 described above.

As described in FIG. 11 above, the rotation layer or the permutation layer may be derived through an optimization procedure, and the optimization procedure may be performed based on matching the Layered Givens Transform matrix with the given transform matrix H. Particularly, the optimization procedure of the rotation layer may be performed by determining an optimal rotation angle of a rotation matrix in the rotation layer based on matching the Layered Givens Transform matrix with the given transform matrix H, and determining non-overlapped pairs that maximizes total summation of gain which is determined based on the optimal rotation angle. As described in Equation 25 above, the encoder may find a maximum matching pair of edges which are not overlapped by using the Blossom algorithm.

Further, as described in Equations 40, 41 and 42 above, the Hungarian algorithm may be performed by using an input to which the absolute operator is applied.

In addition, the optimization procedure of the rotation layer may further include step of setting at least one other rotation layer in the Layered Givens Transform to an identity matrix. As described in the simulated annealing algorithm above, a global optimal value may be found by comparing a newly derived optimal value with the existing optimal value through an initialization of neighboring layers.

The encoder obtains a Layered Givens Transform (LGT) coefficient based on the first permutation layer and the second permutation layer (step, S1502).

As described in FIG. 15 above, the rotation layer and the permutation layer are applied to the input data which is arranged in the Lexicographic Order, and the Layered Givens Transform coefficient may be obtained.

In addition, as described in FIG. 15 above, the LGT coefficient may be obtained by sequentially applying the first permutation layer, the rotation layer and the second permutation layer respectively.

The encoder performs quantization and entropy encoding with respect to the Layered Givens Transform (LGT) coefficient (step, S1503).

Figure 16:
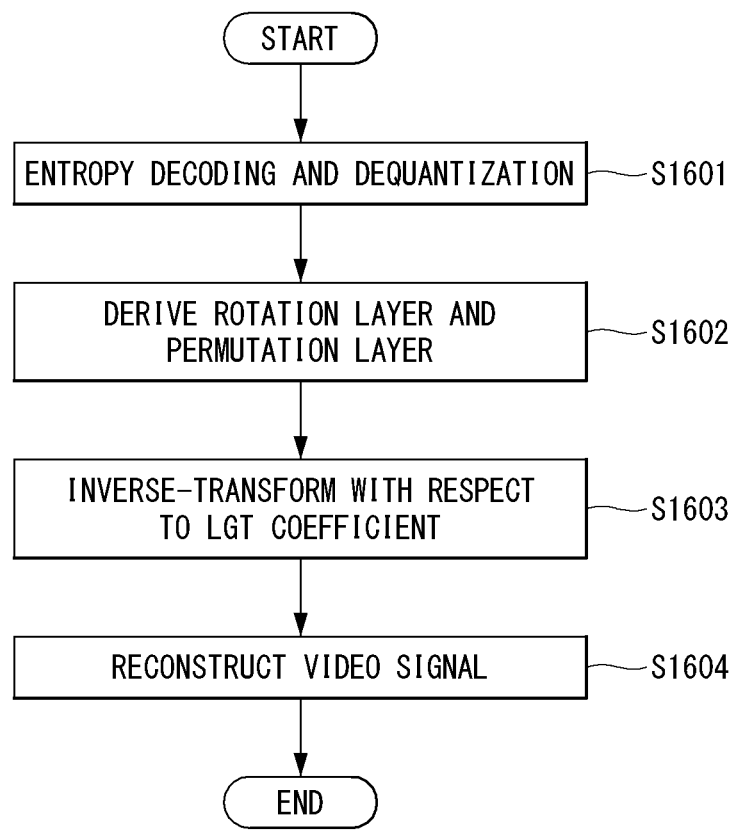
FIG. 16 is a flowchart for describing a procedure of performing decoding by using the Layered Givens Transform as an embodiment to which the present invention is applied.

FIG. 16 is a flowchart for describing a procedure of performing decoding by using the Layered Givens Transform as an embodiment to which the present invention is applied.

A decoder obtains a Layered Givens Transform (LGT) coefficient by performing entropy decoding and dequantization for a residual signal included in a video signal received from an encoder (step, S1601).

The decoder derives at least one of a rotation layer, a first permutation layer and a second permutation layer based on a given transform matrix H and an error parameter (step, S1602). As described above, the first permutation layer and the second permutation layer may include a permutation matrix which is obtained by permuting a row in an identity matrix. Further, the rotation layer may include a permutation matrix and a rotation matrix, and the rotation matrix may include at least one pairwise rotation matrix.

For example, the first permutation layer may be P in Equation 34 described above, and the second permutation layer may be Q in Equation 35.

As described above, the pairwise rotation matrix may be formed by considering a pairwise rotation as represented in Equation 5 described above, and may also be formed by considering pairwise rotation plus reflection as represented in Equation 6 described above.

In addition, the error parameter may be determined based on Equations 11, 14, 26 or 36.

As described in FIG. 10 above, the first permutation layer or the second permutation layer may be derived through an optimization procedure, and the optimization procedure may be performed based on matching the Layered Givens Transform (LGT) matrix with the given transform matrix H. Herein, the Layered Givens Transform (LGT) matrix may be derived from the rotation layer, the first permutation layer or the second permutation layer by using Equation 35 described above. In addition, the optimization procedure of the first permutation layer or the second permutation layer may be performed by using the Hungarian algorithm. Particularly, the decoder may determine an optimal assignment which is not overlapped among nodes by using Equation 16, 36, 37 or 38 described above.

As described in FIG. 11 above, the rotation layer or the permutation layer may be derived through an optimization procedure, and the optimization procedure may be performed based on matching the Layered Givens Transform matrix with the given transform matrix H. Particularly, the optimization procedure of the rotation layer may be performed by determining an optimal rotation angle of a rotation matrix in the rotation layer based on matching the Layered Givens Transform matrix with the given transform matrix H, and determining non-overlapped pairs that maximizes total summation of gain which is determined based on the optimal rotation angle. As described in Equation 25 above, the decoder may find a maximum matching pair of edges which are not overlapped by using the Blossom algorithm.

Further, as described in Equations 40, 41 and 42 above, the Hungarian algorithm may be performed by using an input to which the absolute operator is applied.

In addition, the optimization procedure of the rotation layer may further include step of setting at least one other rotation layer in the Layered Givens Transform to an identity matrix. As described in the simulated annealing algorithm above, a global optimal value may be found by comparing a newly derived optimal value with the existing optimal value through an initialization of neighboring layers.

The decoder performs inverse-transform with respect to the Layered Givens Transform (LGT) coefficient based on the rotation layer, the first permutation layer and the second permutation layer (step, S1603).

As described in FIG. 15 above, the inverse-transform with respect to the LGT coefficient may be performed by sequentially applying the first permutation layer, the rotation layer and the second permutation layer respectively.

The decoder reconstructs the video signal by using the inverse-transformed coefficient (step, S1604).

Referring to FIG. 15, step of deriving LGT and step of obtaining an LGT coefficient by applying the derived LGT may be included in the encoding process, and referring to FIG. 16, step of deriving LGT and step of performing inverse-transform by using the derived LGT may be included in the decoding process.

Meanwhile, in an embodiment of the present invention, the optimal LGT may be derived in off-line by using the method described above. In this case, the encoder/decoder may select the optimal LGT derived through off-line based on a prediction mode or context, and may perform encoding/decoding by using it. Otherwise, the encoder may perform encoding of the optimal LGT derived in off-line based on Rate-Distortion Optimization (RDO), and may signal the information related to the selected LGT to the decoder. The decoder may perform decoding by using the optimal LGT derived in off-line and the LGT related information which is received from the encoder.

Figure 17:
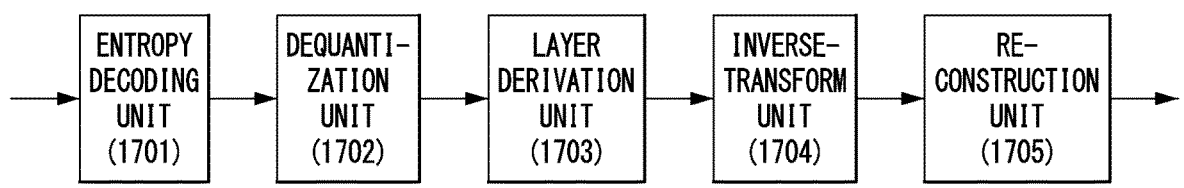
FIG. 17 is a diagram illustrating a decoder in detail to which the present invention is applied.

FIG. 17 is a diagram illustrating a decoder in detail to which the present invention is applied.

Referring to FIG. 17, a decoder 200 implements the function, the process and/or the method proposed in FIG. 2 to FIG. 15 above. Particularly, the decoder 200 may include an entropy decoding unit 1701, a dequantization unit 1702, a layer derivation unit 1703, an inverse-transform unit 1704 and a reconstruction unit 1705. In FIG. 17, it is shown that the layer derivation unit 1703 is a separate element from the inverse-transform unit 1704, but the layer derivation unit 1703 may be implemented as being included in the inverse-transform unit 1704.

The entropy decoding unit 1701 and the dequantization unit 1702 perform entropy decoding and inverse-transform with respect to a residual signal included in a video signal received from an encoder, and accordingly, obtain a Layered Givens Transform (LGT) coefficient.

The layer derivation unit 1703 derives at least one rotation layer, a first permutation layer and a second permutation layer.

As described above, the first permutation layer and the second permutation layer may include a permutation matrix which is obtained by permuting a row in an identity matrix. Further, the rotation layer may include a permutation matrix and a rotation matrix, and the rotation matrix may include at least one pairwise rotation matrix.

For example, the first permutation layer may be P in Equation 34 described above, and the second permutation layer may be Q in Equation 35.

As described above, the pairwise rotation matrix may be formed by considering a pairwise rotation as represented in Equation 5 described above, and may also be formed by considering pairwise rotation plus reflection as represented in Equation 6 described above.

In addition, the error parameter may be determined based on Equations 11, 14, 26 or 36.

As described in FIG. 10 above, the first permutation layer or the second permutation layer may be derived through an optimization procedure, and the optimization procedure may be performed based on matching the Layered Givens Transform (LGT) matrix with the given transform matrix H. Herein, the Layered Givens Transform (LGT) matrix may be derived from the rotation layer, the first permutation layer or the second permutation layer by using Equation 35 described above. In addition, the optimization procedure of the first permutation layer or the second permutation layer may be performed by using the Hungarian algorithm. Particularly, the decoder may determine an optimal assignment which is not overlapped among nodes by using Equation 16, 36, 37 or 38 described above.

As described in FIG. 11 above, the rotation layer or the permutation layer may be derived through an optimization procedure, and the optimization procedure may be performed based on matching the Layered Givens Transform matrix with the given transform matrix H. Particularly, the optimization procedure of the rotation layer may be performed by determining an optimal rotation angle of a rotation matrix in the rotation layer based on matching the Layered Givens Transform matrix with the given transform matrix H, and determining non-overlapped pairs that maximizes total summation of gain which is determined based on the optimal rotation angle. As described in Equation 25 above, the layer derivation unit 1703 may find a maximum matching pair of edges which are not overlapped by using the Blossom algorithm.

Further, as described in Equations 40, 41 and 42 above, the Hungarian algorithm may be performed by using an input to which the absolute operator is applied.

In addition, the optimization procedure of the rotation layer may further include step of setting at least one other rotation layer in the Layered Givens Transform to an identity matrix. As described in the simulated annealing algorithm above, a global optimal value may be found by comparing a newly derived optimal value with the existing optimal value through an initialization of neighboring layers.

The inverse-transform unit 1704 performs inverse-transform with respect to the Layered Givens Transform (LGT) coefficient based on the first permutation layer and the second permutation layer.

As described in FIG. 15 above, the inverse-transform with respect to the LGT coefficient may be performed by sequentially applying the first permutation layer, the rotation layer and the second permutation layer respectively.

The reconstruction unit 1705 reconstructs the video signal by using the inverse-transformed coefficient.

As described above, the embodiments explained in the present invention may be implemented and performed on a processor, a micro processor, a controller or a chip. For example, functional units explained in FIG. 1, FIG. 2 and FIG. 4 may be implemented and performed on a computer, a processor, a micro processor, a controller or a chip.

In addition, the decoder and the encoder to which the present invention is applied may be included in a multimedia broadcasting transmission/reception apparatus, a mobile communication terminal, a home cinema video apparatus, a digital cinema video apparatus, a surveillance camera, a video chatting apparatus, a real-time communication apparatus, such as video communication, a mobile streaming apparatus, a storage medium, a camcorder, a VoD service providing apparatus, an Internet streaming service providing apparatus, a three-dimensional (3D) video apparatus, a teleconference video apparatus, and a medical video apparatus and may be used to process video signals and data signals.

Furthermore, the processing method to which the present invention is applied may be produced in the form of a program that is to be executed by a computer and may be stored in a computer-readable recording medium. Multimedia data having a data structure according to the present invention may also be stored in computer-readable recording media. The computer-readable recording media include all types of storage devices in which data readable by a computer system is stored. The computer-readable recording media may include a BD, a Universal Serial Bus (USB), ROM, RAM, CD-ROM, a magnetic tape, a floppy disk, and an optical data storage device, for example. Furthermore, the computer-readable recording media includes media implemented in the form of carrier waves (e.g., transmission through the Internet). Furthermore, a bit stream generated by the encoding method may be stored in a computer-readable recording medium or may be transmitted over wired/wireless communication networks.

So far, the preferred embodiment of the present invention described above is described as an example and it is understood that a skilled person in the art may improve, modify, substitute the embodiments or add other various other embodiments in the inventive concept and the technical scope of the present invention disclosed in the claims attached below.

According to an embodiment of the present invention, by designing a transform that has the same or similar compression efficiency as/to the given target transform in the significantly decreased calculation complexity in comparison with the target transform, encoding performance may be increased.

In addition, according to an embodiment of the present invention, by using a permutation matrix as front and rear layers among the layers included in the Layers Givens Transform, the approximation for the target transform may be more increased, and the compression performance of an image may be improved.

In addition, by taking an absolute value in an input of the Hungarian algorithm, it may be found an optimal solution considering all possibilities including the negative sign. Through this, a convergence speed of the Layers Givens Transform (LGT) designing algorithm may become faster, and it is available to design the LGT more approximate to the target transform.

The technical effects of the present invention are not limited to the technical effects described above, and other technical effects not mentioned herein may be understood to those skilled in the art from the description below.

What is claimed is:

1. A method for performing a transform by using Layered Givens Transform (LGT), the method comprising:
deriving at least one rotation layer, a first permutation layer and a second permutation layer based on a given transform matrix H and an error parameter, wherein:
the first permutation layer or the second permutation layer is derived through a first optimization procedure based on Hungarian algorithm,
the first optimization procedure is performed based on matching a LGT matrix with the given transform matrix H,
the LGT matrix is derived by using the at least one rotation layer, the first permutation layer, and the second permutation layer, and
the Hungarian algorithm is performed by using an input to which an absolute operator is applied;
obtaining a LGT coefficient based on the at least one rotation layer, the first permutation layer, and the second permutation layer; and
performing quantization and entropy encoding with respect to the LGT coefficient,
wherein the first permutation layer and the second permutation layer include a permutation matrix obtained by permuting a row of an identity matrix, and
wherein the LGT coefficient is obtained by applying the second permutation layer after applying the first permutation layer and the at least one rotation layer.

2. The method of claim 1, wherein the at least one rotation layer includes a permutation matrix and
at least one pairwise rotation matrix.

3. The method of claim 1,
wherein the at least one rotation layer is derived through a second optimization procedure, and wherein the second optimization procedure includes:
determining an optimal rotation angle of a rotation matrix in the at least one rotation layer based on matching the LGT matrix with the given transform matrix H, and
determining non-overlapped pairs that maximize total summation of gain based on the optimal rotation angle.

4. The method of claim 3, wherein the second optimization procedure further includes setting at least one other rotation layer in the LGT to an identity matrix.

5. A method for performing an inverse-transform by using Layered Givens Transform (LGT), the method comprising:
obtaining a LGT coefficient by performing an entropy encoding and a dequantization with respect to a residual signal included in a video signal;
deriving at least one rotation layer, a first permutation layer, and a second permutation layer based on a given transform matrix H and an error parameter, wherein:
the first permutation layer or the second permutation layer is derived through a first optimization procedure based on Hungarian algorithm,
the first optimization procedure is performed based on matching a LGT matrix with the given transform matrix H,
the LGT matrix is derived by using the at least one rotation layer, the first permutation layer, and the second permutation layer, and
the Hungarian algorithm is performed by using an input to which an absolute operator is applied;
performing an inverse-transform with respect to the LGT coefficient based on the at least one rotation layer, the first permutation layer and the second permutation layer; and
reconstructing the video signal by using the inverse-transformed coefficient,
wherein the first permutation layer and the second permutation layer include a permutation matrix obtained by permuting a row of an identity matrix, and
wherein the inverse-transform with respect to the LGT coefficient is performed by applying the first second permutation layer applying the first permutation layer and the at least one rotation layer.

6. The method of claim 5, wherein the at least one rotation layer includes a permutation matrix and
at least one pairwise rotation matrix.

7. The method of claim 5,
wherein the at least one rotation layer is derived through a second optimization procedure, and
wherein the second optimization procedure includes:
determining an optimal rotation angle of a rotation matrix in the at least one rotation layer based on matching the LGT matrix with the given transform matrix H, and
determining non-overlapped pairs that maximize total summation of gain based on the optimal rotation angle.

8. The method of claim 7, wherein the second optimization procedure further includes setting at least one other rotation layer in the LGT to an identity matrix.

9. An apparatus for performing an inverse-transform by using Layered Givens Transform (LGT), the apparatus comprising:
a processor configured to:
entropy-decode a residual signal included in a video signal, derive at least one rotation layer, a first permutation layer, and a second permutation layer based on a given transform matrix H and an error parameter, wherein:
the first permutation layer or the second permutation layer is derived through a first optimization procedure based on Hungarian algorithm,
the first optimization procedure is performed based on matching a LGT matrix with the given transform matrix H,
the LGT matrix is derived by using the at least one rotation layer, the first permutation layer, and the second permutation layer, and
the Hungarian algorithm is performed by using an input to which an absolute operator is applied,
obtain a LGT coefficient based on the at least one rotation layer, the first permutation layer, and the second permutation layer, and
perform quantization and entropy encoding with respect to the LGT coefficient,
wherein the first permutation layer and the second permutation layer include a permutation matrix obtained by permuting a row of an identity matrix, and
wherein the inverse-transform with respect to the LGT coefficient is performed by applying the second permutation layer after applying the first permutation layer and the at least one rotation layer.

* * * * *